(12) United States Patent
Sweeney et al.

(10) Patent No.: US 12,345,441 B2
(45) Date of Patent: Jul. 1, 2025

(54) MEMBRANE-CONTACTOR-BASED AIR CONDITIONER

(71) Applicant: Tyco Fire & Security GmbH, Neuhausen am Rheinfall (CH)

(72) Inventors: Michael J Sweeney, Seattle, WA (US); Ryan Vetsch, Fort Saskatchewan (CA); David Patrick Selmser, St Albert (CA); Andrew Kim Liang Chan, Edmonton (CA); Philip Thai, Edmonton (CA); Nicholas Labonte, Edmonton (CA)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 18/373,135

(22) Filed: Sep. 26, 2023

(65) Prior Publication Data

US 2024/0011650 A1    Jan. 11, 2024

Related U.S. Application Data

(63) Continuation of application No. 17/482,181, filed on Sep. 22, 2021, now Pat. No. 11,767,992.

(Continued)

(51) Int. Cl.
*F24F 5/00* (2006.01)
*F28D 5/00* (2006.01)

(Continued)

(52) U.S. Cl.
CPC .............. *F24F 5/0035* (2013.01); *F28D 5/00* (2013.01); *F28D 21/0015* (2013.01); *F24F 2003/1435* (2013.01); *F28D 2021/0064* (2013.01)

(58) Field of Classification Search
CPC .......... F28D 21/0015; F28D 2021/0064; F24F 5/0035; F24F 6/06; F24F 11/84; F24F 13/12; F24F 13/30
See application file for complete search history.

(56) References Cited

U.S. PATENT DOCUMENTS

| | | | |
|---|---|---|---|
| 4,940,475 A * | 7/1990 | Yaeger | F24F 3/14 55/440 |
| 5,309,726 A * | 5/1994 | Asbridge | F24F 5/0035 62/309 |

(Continued)

OTHER PUBLICATIONS

International Search Report and Written Opinion for PCT Application No. PCT/IB2022/051179, dated on Jul. 4, 2022, 18 pages.

*Primary Examiner* — Eric S Ruppert
*Assistant Examiner* — Hans R Weiland
(74) *Attorney, Agent, or Firm* — Fletcher Yoder, PC

(57) ABSTRACT

An air conditioner includes an air flow path configured to direct an air flow in a direction. The air conditioner also includes an evaporative cooling membrane panel disposed within the air flow path and including a face disposed at an oblique angle relative to the direction. The face is defined by microporous fibers of the evaporative cooling membrane panel. Each microporous fiber is configured to receive liquid in a fluid flow path of the microporous fiber such that the air flow over the microporous fiber generates a vapor. Each microporous fiber is also configured to release the vapor into the air flow via pores of the microporous fiber.

20 Claims, 14 Drawing Sheets

Related U.S. Application Data

(60) Provisional application No. 63/147,420, filed on Feb. 9, 2021.

(51) Int. Cl.
  *F28D 21/00* (2006.01)
  *F24F 3/14* (2006.01)

(56) References Cited

U.S. PATENT DOCUMENTS

| | | |
|---|---|---|
| 5,946,931 A | 9/1999 | Lomax et al. |
| 9,541,302 B2 | 1/2017 | Taylor et al. |
| 2008/0018001 A1* | 1/2008 | Kammerzell ........... F24F 6/043 |
| | | 62/304 |
| 2012/0304862 A1* | 12/2012 | Taylor .................... B01D 63/02 |
| | | 96/10 |
| 2013/0213076 A1* | 8/2013 | Gerlach ................. F24F 13/15 |
| | | 261/104 |
| 2013/0269924 A1 | 10/2013 | Bugler et al. |
| 2013/0320573 A1* | 12/2013 | Fisher ....................... F24F 6/02 |
| | | 261/127 |
| 2017/0321913 A1* | 11/2017 | Dinnage ................. F24F 13/14 |
| 2018/0372387 A1 | 12/2018 | Echols |
| 2020/0208887 A1* | 7/2020 | Mohammad ........... F25B 39/04 |
| 2020/0284480 A1* | 9/2020 | Tolouei Asbforoushani ............... |
| | | F25B 25/005 |

* cited by examiner

MEMBRANE-CONTACTOR-BASED AIR CONDITIONER

CROSS-REFERENCE TO RELATED APPLICATIONS

This application is a continuation of U.S. patent application Ser. No. 17/482,181, entitled "MEMBRANE-CONTACTOR-BASED AIR CONDITIONER," filed Sep. 22, 2021, which claims priority from and the benefit of U.S. Provisional Application Ser. No. 63/147,420, entitled "MEMBRANE-CONTACTOR-BASED AIR CONDITIONER," filed Feb. 9, 2021, which are hereby incorporated by reference in their entireties for all purposes.

BACKGROUND OF THE DISCLOSURE

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

HVAC equipment and independent cooling devices, such as air handling units, localized air coolers, fan walls, and building systems, face many design constraints during their development. The air supplied through such equipment needs to match stringent design specifications, the footprint must be minimized to save space on-site, and the overall energy consumption should be optimized. As a result, designers must carefully select any components internal to the equipment so as to meet these and other constraints.

Accordingly, there has been an increased utilization of evaporative cooling technology in recent years due to its lower energy consumption compared to other cooling methods. Evaporative coolers lower the temperature of an airstream through the introduction and subsequent evaporation of water particles. These components prove especially useful when the inlet air conditions are dry and warm. Traditional evaporative coolers generally consist of evaporative media, an assembly to hold the media in place, a supply water reservoir, and a water distribution system. Water is piped from the reservoir to the top of the evaporative media; as water gravity drains downward, some water is absorbed into the evaporative media, and the rest falls back into the supply water reservoir. When air passes through this wetted media, water evaporates into the airstream, and it is this process which adiabatically cools the air.

Traditional evaporative coolers have several drawbacks. For example, traditional evaporative coolers are susceptible to water carryover. Water carryover is a process in which air passing through the evaporative media pulls excess water droplets out into the air, resulting in the unintentional accumulation of water in the downstream area. At high air velocities, this process becomes more pronounced. Further, the evaporative media of traditional evaporative coolers may be oriented generally perpendicular to an air flow passing over the evaporative media, such that pressure and velocity profiles across the media are substantially uniform. While this orientation may reduce water carryover, it increases a size of the traditional evaporative cooler. The relatively large size of traditional evaporative coolers may be compounded by the inclusion of a containment device below the evaporative media that collects water as it is gravity-fed downwardly, and by the use of a mist eliminator downstream of the evaporative media and configured to absorb water carried through the air. The mist eliminator also generates a pressure drop that causes an increase in power requirements and corresponding decrease in overall efficiency of the traditional evaporative cooler.

Further, traditional evaporative coolers may require the use of relatively clean water to reduce mineral deposits, commonly known as "scale" build-up. The susceptibility of traditional evaporative coolers to mineral deposits may require time consuming maintenance techniques and/or excessive water replacement. Further, traditional evaporative coolers are limited in their ability to precisely control the supply air temperature and humidity. In general, the exiting air can be controlled by turning the traditional evaporative cooler ON or OFF depending on the temperature or humidity requirements. That is, delivery of water to the evaporative media may be enabled when the traditional evaporative cooler is ON and disabled when the evaporative cooler is OFF. However, the evaporative media may remain wet for a time period after the traditional evaporative cooler is switched to OFF, causing additional cooling and humidification to occur, which contributes to control latency of the traditional evaporative cooler. Further still, once the media is wet, the amount of water that evaporates into the airstream is completely dependent on the incoming air conditions. For the foregoing reasons, among others, it is now recognized that improved evaporative cooling systems and methods are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an air conditioner includes an air flow path configured to direct an air flow in a direction. The air conditioner also includes an evaporative cooling membrane panel disposed within the air flow path and including a face disposed at an oblique angle relative to the direction. The face is defined by microporous fibers of the evaporative cooling membrane panel. Each microporous fiber is configured to receive liquid in a fluid flow path of the microporous fiber such that the air flow over the microporous fiber generates a vapor. Each microporous fiber is also configured to release the vapor into the air flow via pores of the microporous fiber.

In another embodiment, an air conditioner includes an air flow path configured to direct an air flow in a direction, and an evaporative cooling panel disposed within the air flow path. A membrane of the evaporative cooling panel is defined by microporous fibers, each microporous fiber including a fluid flow path configured to direct a fluid therethrough and pores configured to block passage of the fluid in a liquid form through the pores but allow passage of the fluid in a vapor form through the pores. A face of the membrane is disposed at an oblique angle relative to the direction. The face is configured to facilitate passage of the air flow over the microporous fibers, generation of the vapor from the liquid in the microporous fibers based on heat exchange between the fluid and the air flow, and release of the vapor via the pores into the air flow.

In another embodiment, an air conditioner includes a first evaporative cooling membrane panel disposed in an air flow channel configured to receive an air flow therethrough, a second evaporative cooling membrane panel disposed in the air flow channel, and a controller. The controller is configured to control movement of the first evaporative cooling membrane panel, the second evaporative cooling membrane panel, or both to cause an open configuration in which a gap is formed in the air flow channel. The gap is configured to receive a portion of the air flow such that the portion of the air flow bypasses the first evaporative cooling membrane panel and the second evaporative cooling membrane panel. The controller is also configured to control movement of the first evaporative cooling membrane panel, the second evaporative cooling membrane panel, or both to cause a closed configuration in which the gap is removed.

BRIEF DESCRIPTION OF THE DRAWINGS

Various aspects of this disclosure may be better understood upon reading the following detailed description and upon reference to the drawings in which.

DETAILED DESCRIPTION

Figure 1:
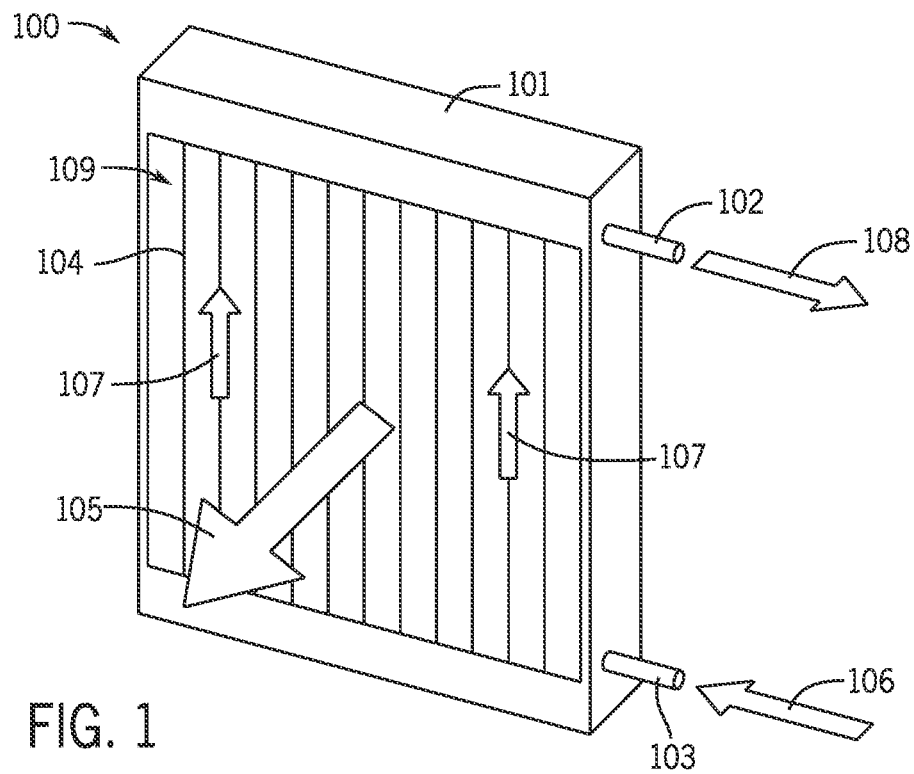
FIG. 1 is an isometric view of a downstream side of an individual membrane-contactor panel, which comprises of a panel frame, a plurality of hollow fibers, and one possible configuration for a water inlet port and water outlet port, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates to a modular membrane-contactor-based air conditioner for use in HVAC equipment or as an independent cooling and/or humidifying apparatus. In particular, this disclosure relates to evaporative cooling, humidifying, and other such processes which supply conditioned air for use in applications including, but not limited to, building rooms, data center server rooms, agricultural facilities, and industrial processes.

The utilization of evaporative cooling technology has increased in recent years due to its lower energy consumption compared to other cooling methods. Evaporative coolers lower the temperature of an airstream through the introduction and subsequent evaporation of water particles. These components prove especially useful when the inlet air conditions are dry and warm. Traditional evaporative coolers generally consist of evaporative media, an assembly to hold the media in place, a supply water reservoir, and a water distribution system. Water is piped from the reservoir to the top of the evaporative media; as water gravity drains downward, some water is absorbed into the evaporative media, and the rest falls back into the supply water reservoir. When air passes through this wetted media, water evaporates into the airstream, and it is this process which adiabatically cools the air.

One drawback of conventional evaporative cooling systems is their size. The need for a containment device below the evaporative media to collect the water that drains down means that these devices tend to take up more space than other standard cooling methods, such as chilled water coils. Further compounding this sizing issue is the fact that conventional evaporative media is susceptible to "water carryover" at high face velocities. Water carryover is a process where air passing through evaporative media pulls excess water droplets out into the air, resulting in the unintentional accumulation of water in the downstream area. At high air velocities, this process becomes more pronounced. As a result, the face area of conventional evaporative coolers tends to be larger so as to reduce the face velocity, thereby further increasing the overall footprint. Certain existing solutions can resolve water carryover, such as the use of a "mist eliminator" which absorbs any water carried through by the air. However, this extra material within the air path causes the power requirements of the cooling device to increase, thereby lowering the overall efficiency.

Moreover, traditional evaporative media must be used with relatively clean water to function properly. As water evaporates into the airstream, it leaves behind mineral deposits, commonly known as "scale" build-up. As water runs over the media continuously, these minerals get redissolved into the system's water. When the concentration of dissolved minerals becomes too high, the rate of scale formation and corrosion increases, reducing the life of the media and overall system. To avoid such problems, conventional evaporative coolers regularly bleed-off a portion of their water supply and replace it with clean, fresh water. This need to regularly "bleed" water in order to maintain high water quality means that conventional evaporative coolers waste a large amount of water throughout their lifetime, leading to lower operational and environmental efficiencies.

Another drawback of traditional evaporative coolers is that their media must be scrupulously installed and maintained for proper functionality. In the case where the media is improperly installed, water carryover can ensue. This occurs because any gaps in the media cause high velocity air to be generated, which pulls large amounts of water out into the downstream area. Improper installation of media can also reduce the performance of the evaporative cooler. As the media is designed to provide a certain quantity of adiabatic cooling to meet the design conditions, when media is not installed properly, a lower-than-designed-for cooling capacity is provided. Moreover, traditional evaporative media is susceptible to maintenance issues, such as biological growth. Biological growth, in the context of evaporative media, requires several elements to take place: a moist environment and the availability of minerals and nutrients. Because traditional media is continually wetted with water that contains dissolved minerals, biological growth can readily occur if left untreated for extended periods of time. To avoid this, stringent maintenance practices must be followed. For example, some manufacturers suggest that the media be regularly dried; however, this takes valuable time away from cooling and humidifying the airstream. Others suggest using cleaning agents; this too is imperfect, as the chemically modified water must be drained after use, leading to further water wastage and other potential environmental impacts.

In addition, conventional evaporative coolers can only exist in a limited number of orientations, all of which require water to be sprayed onto the top of the media and trickle down to the supply reservoir below.

Further, traditional evaporative coolers are limited in their ability to precisely control the supply air temperature and humidity. Simplistically, the exiting air can be controlled by turning the whole evaporative cooler ON or OFF depending on the temperature or humidity requirements. If the supply air temperature goes above a threshold or the humidity drops below a limit, the evaporative cooler switches ON. Conversely, if the temperature goes below the threshold or the humidity rises above the limit, the evaporative cooler switches OFF. However, this setup does not work perfectly because when the evaporative cooler is turned OFF the media is still wet. As it takes a significant amount of time to dry the media, the air is cooled and/or humidified beyond what is required long after the evaporative cooler turns OFF; thus, there is a high degree of control latency associated with these traditional evaporative cooling systems. To resolve this issue, bypass dampers can be added. These allow some air to "bypass" the evaporative cooler altogether, providing more control over the supply air conditions. However, bypass dampers take up additional space within the system, further expanding the footprint of the design. Another way to control the leaving air conditions is to provide "staging" within the evaporative cooler. Staging is a design feature in which an evaporative cooler can activate/wet certain sections of its media independently from any other section of media. Each independent media section is known as a "stage". By doing this, the control system can turn on stages incrementally, thereby providing granular control over the cooling capacity and water consumption when compared with single-stage coolers. However, staging in conventional evaporative coolers is imperfect because when an evaporative cooler stage turns OFF, the aforementioned issue of control latency arises. Furthermore, because the water must gravity drain downwards, the media can only be split vertically. This severely limits the number of cooling stage configurations, as well as the total number of stages per configuration that can be practically built. Finally, traditional evaporative coolers offer no way to control the rate of evaporation. Once the media is wet, the amount of water that evaporates into the airstream is completely dependent on the incoming air conditions.

Membrane-contactor panels composed of a plurality of microporous hollow fibers are known in the art (for example, 3M® media utilizing CELGARD® microporous hollow fibers). Such membrane-contactor panels have an internal cavity through which water can flow. The walls of the microporous hollow fibers are permeable only to water in the vapor form; liquid water cannot exit the walls of the microporous hollow fibers to directly mix with the ambient gas stream. As water vapor exits the walls of the microporous hollow fibers via pores in the walls, it comes into direct contact with the gas stream resulting in a transfer of mass and energy. This contrasts with traditional evaporative media whereby the liquid water wetting the media's surface evaporates directly into the ambient gas stream.

It is an object of the disclosure to integrate membrane-contactor technology into a membrane-contactor-based air conditioner system that can be utilized in HVAC equipment or as an independent cooling and/or humidifying apparatus.

This disclosure is directed toward integration of independent, modular membrane-contactor panels that can be custom-assembled into any combination of vertical- or horizontal-banked configurations and orientations, and permit different embodiments of the membrane-contactor-based air conditioner that can be adapted to a multitude of applications. Presently disclosed systems enable maximization of exposed surface area in contact with airstreams for a given system dimensional footprint, allowance of multitudes of air flow patterns in air flow direction angles that are not necessarily aligned with or parallel to the horizontal plane, infinite scalability of the device to accept any membrane-contactor panel size and quantity, and use of standardized, independent components to promote component economies of scale, increase design variety and, improve ease of assembly.

Further, presently disclosed systems avoid the risk of water droplet carry-over and eliminates the need for "mist eliminators", which adds to the power consumption of overall system. Presently disclosed systems enhance cooling efficiency by minimizing water usage through precision control of modular membrane-contactor panels. Membrane-contactor panel sections or a matrix of membrane-contactor panels can be selectively activated and deactivated, and moved into and out of air streams through use of actuating devices, to provide infinite cooling capacity control that better matches fluctuating application cooling demands with reduced control latency. Furthermore, the modular design of the disclosure promotes interchangeability between modular membrane-contactor panels and reduces interdependencies between components in the assembly; individual modules can be decoupled from the overall assembly with ease. This allows the service, maintenance, or replacement of said membrane-contactor panels to be done on a component-by-component basis, reducing overall system life-cycle service cost and service time of the membrane-contactor-based air conditioner.

In general, the present disclosure solves the problems associated with conventional evaporative coolers by employing membrane-contactor media within an air conditioning system. For example, employing media utilizing microporous hollow fibers permits a transfer of mass and energy as water vaporizes out of the microporous hollow fiber walls into the gas stream flowing over said fibers. Moreover, because only water vapor exits the microporous hollow fibers, there is a limited risk of liquid water carryover being present in the gas stream.

An individual membrane-contactor panel 100 suitable for use in the present disclosure is shown in FIG. 1. FIG. 1 illustrates a downstream side (e.g., relative to a direction of air flow) of the membrane-contactor panel 100. The membrane-contactor panel 100 comprises a frame 101, water outlet port 102, water inlet port 103, and a plurality of microporous hollow fibers 104 that are supported by fabric weaves or other means. Air flow 105 depicts the conditioned discharge air that exits the membrane-contactor panel 100. Water enters the membrane-contactor panel through water inlet port 103, is distributed into the cavity of each individual microporous hollow fiber 104, and collectively discharges through the water outlet port 102. 106 represents entering water flow, 107 represents the water flowing through the plurality of microporous hollow fibers 104, and 108 represents the discharge water flow. Although FIG. 1 depicts one possible configuration where the water inlet port 103 is located at the bottom of the membrane-contactor panel and the water outlet port 102 is located at the top of the membrane-contactor panel, it should be noted that the water inlet port 103 and water outlet port 102 locations can be situated at other relative orientations or positions on the membrane-contactor panel frame 101. The direction of water flow 107 through the plurality of microporous hollow fibers depends on water inlet and water outlet locations, as well as microporous hollow fiber orientations.

In the illustrated embodiment, the membrane-contactor panel 100 includes a downstream face 109 through which the discharge (or conditioned) air flow 105 passes. The downstream face 109 may be formed by the plurality of microporous hollow fibers 104 and fabric weaves (or other means) utilized to support the microporous hollow fibers 104. The downstream face 109 extends generally along a plane, although it should be understood that the downstream face 109 may not form a perfect plane (e.g., due to curvature of each microporous hollow fiber 104, the fabric waves (or other means), etc. Further, it should be understood that a screen, mesh, or other component of the membrane-contactor panel 100 may be positioned downstream of the downstream face 109. For example, the frame 101 may extend further downstream than the microporous hollow fibers 104 of the downstream face 109. As will be appreciated in view of later drawings and corresponding description, and in accordance with the present disclosure, the downstream face 109 may be oriented at an oblique angle relative to an air flow direction through the membrane-contactor panel 100.

Figure 2:
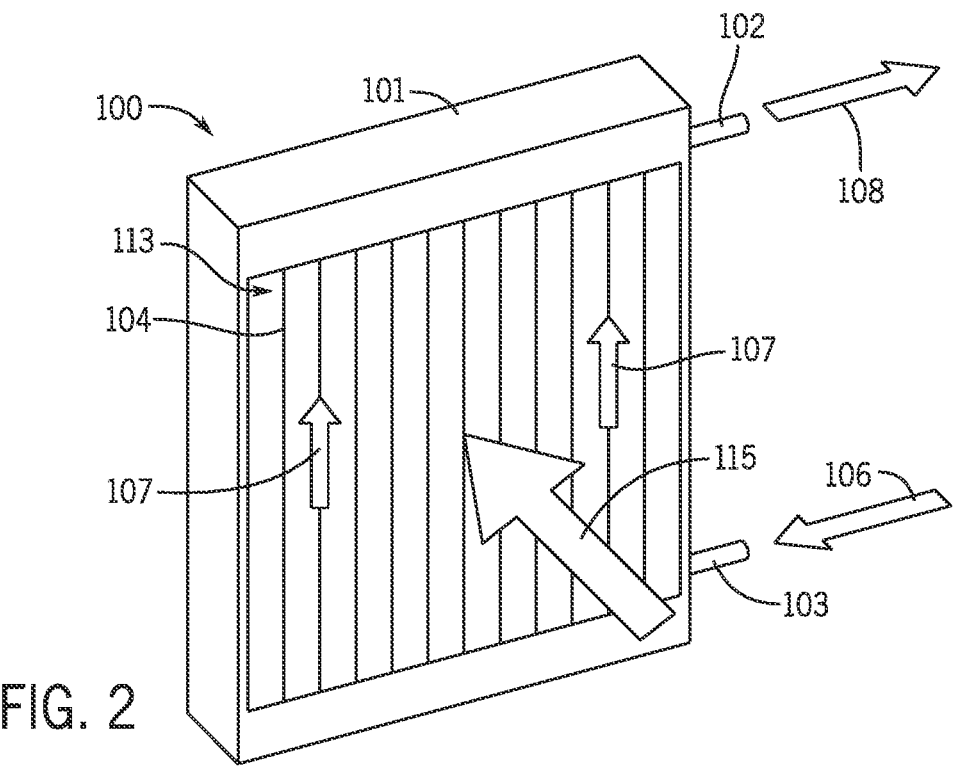
FIG. 2 is an isometric view of an upstream side of the individual membrane-contactor panel of FIG. 1, which comprises the panel frame, the plurality of hollow fibers, and one possible configuration for the water inlet port and water outlet port, in accordance with an aspect of the present disclosure.

FIG. 2 illustrates an upstream side (e.g., relative to a direction of air flow) of the membrane-contactor panel 100. In the illustrated embodiment, the membrane-contactor panel 100 includes an upstream face 113 configured to receive an incoming (or unconditioned) air flow 115. The upstream face 113 may be formed by the plurality of microporous hollow fibers 104 and fabric weaves (or other means) utilized to support the microporous hollow fibers 104. The upstream face 113 extends generally along a plane, although it should be understood that the upstream face 113 may not form a perfect plane (e.g., due to curvature of each microporous hollow fiber 104, the fabric waves (or other means), etc. Further, it should be understood that a screen, mesh, or other component of the membrane-contactor panel 100 may be positioned downstream of the upstream face 113. For example, the frame 101 may extend further downstream than the microporous hollow fibers 104 of the upstream face 113. As will be appreciated in view of later drawings and corresponding description, and in accordance with the present disclosure, the upstream face 113 may be oriented at an oblique angle relative to an air flow direction through the membrane-contactor panel 100.

Figure 3:
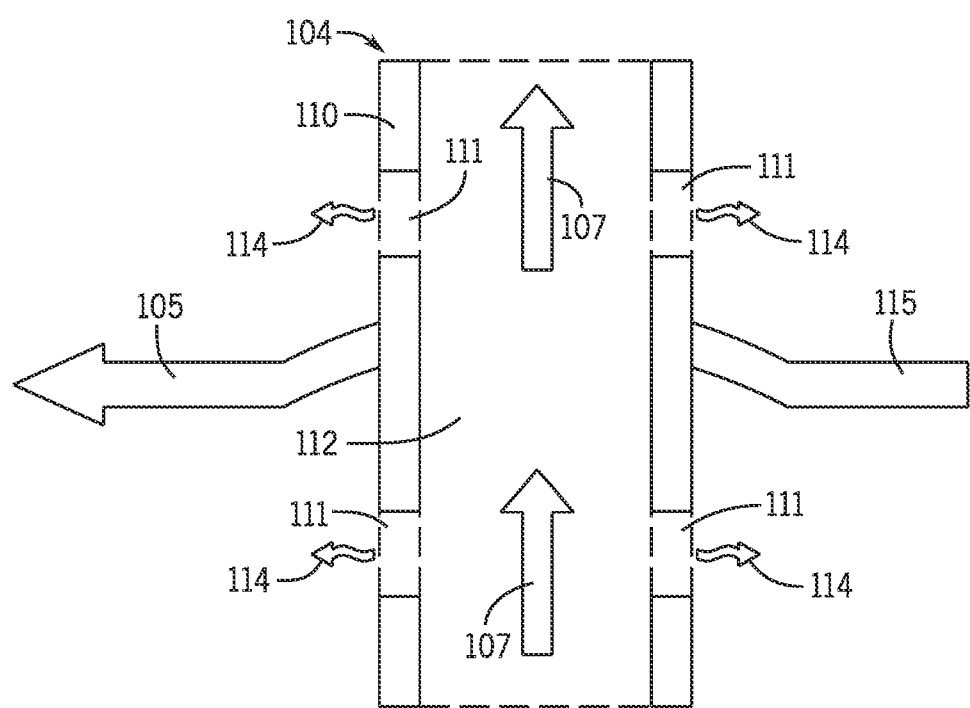
FIG. 3 is a magnified view that depicts the water and air membrane interface of a microporous hollow fiber that resides within an individual membrane-contactor panel, in accordance with an aspect of the present disclosure.

A magnified cross-section of a single microporous hollow fiber 104 is shown in FIG. 3. Water flow 107 (in the liquid phase) moves through a microporous hollow fiber cavity 112 and is contained within the volume enclosed by the microporous hollow fiber walls 110. An unconditioned (or intake) air flow 115 is directed toward the microporous hollow fiber 104. When ambient conditions permit, liquid water vaporizes into the airstream (exterior to the microporous hollow fiber walls 110) by undergoing a phase change. Water vapor 114 exits the microporous hollow fiber cavity 112 through a plurality of pores 111 and comes into direct contact with the ambient air. Water vapor mixes with the ambient air and adiabatically cools and/or humidifies the air stream. This results in the air flow 105 discharged being conditioned from the surface of the membrane-contactor panel 100.

Figure 4:
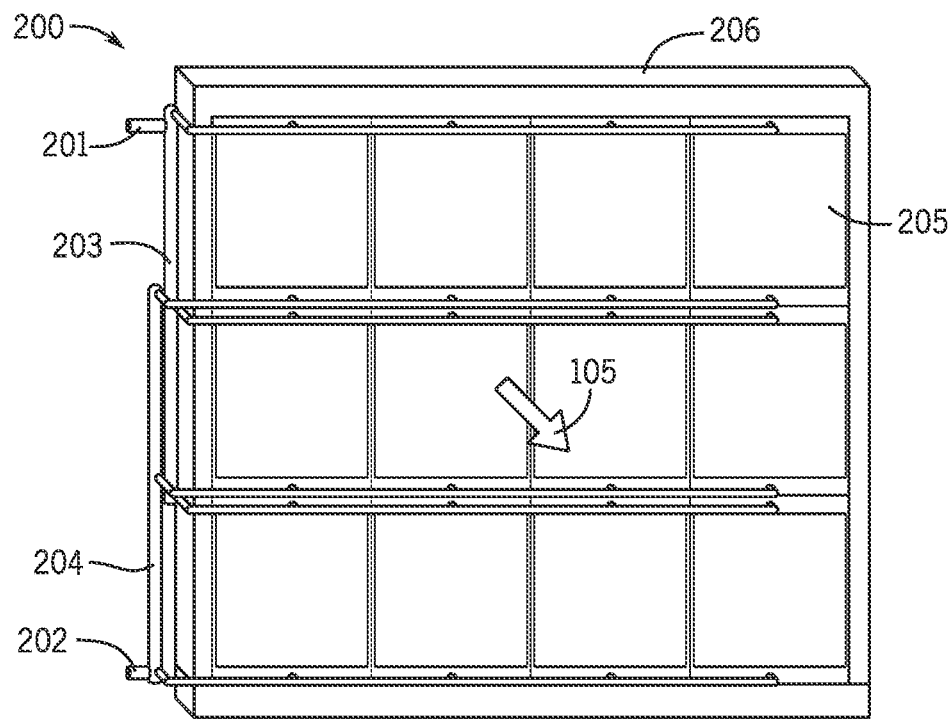
FIG. 4 is an isometric view of a membrane-contactor-based air conditioner, incorporating a matrix of membrane-contactor panels, housing to frame and support the panels, and one possible configuration for water distribution plumbing connected to and from each panel, in accordance with an aspect of the present disclosure.

A membrane-contactor-based air conditioner 200 of the present disclosure is shown in FIG. 4. The membrane-contactor-based air conditioner 200 contains a matrix of membrane-contactor panels 205, a housing structure 206, a water inlet port 202, which attaches to a supply water distribution manifold 204, and a water outlet port 201, which connects to return water collection manifold 203. In this embodiment, the matrix of membrane-contactor panels 205 are installed in a flat-banked configuration in a structured matrix; however, individual membrane-contactor panels of this disclosure can be altered into various orientations and configurations as outlined in subsequent figures. The water inlet 202 supplies water to the matrix of membrane-contactor panels 205 through the supply water distribution manifold 204; conversely, the return water collection manifold 203 collects water that flows out from the matrix of membrane-contactor panels 205 and discharges it through the water outlet port 201. Although FIG. 4 depicts one possible configuration where the water inlet port 202 is located at the bottom of the membrane-contactor-based air conditioner and the water outlet port 201 is located at the top of the membrane-contactor-based air conditioner, it should be noted that the water inlet port 202 and water outlet port 201 locations can be situated at other relative orientations or positions on the membrane-contactor-based air conditioner housing structure 206. Furthermore, water flows through the hollow fibers within each membrane-contactor panel 205 using a fluid moving device (e.g. a pump) that is external to the membrane-contactor-based air conditioner 200. As air flows through the matrix of membrane-contactor panels 205 it contacts the external surfaces of the fibers and is subsequently cooled and/or humidified to the required supply air conditions. A proportion of water volume flowing through the hollow membrane fibers evaporates into the air stream through the pores in the fiber wall in the form of water vapor. Air flow 105 depicts the conditioned discharge air. Membrane-contactor-based air conditioner 200 is a self-contained and self-supported unit that may be incorporated into air handling systems or other evaporative cooling and/or humidification applications in various orientations.

Figure 5:
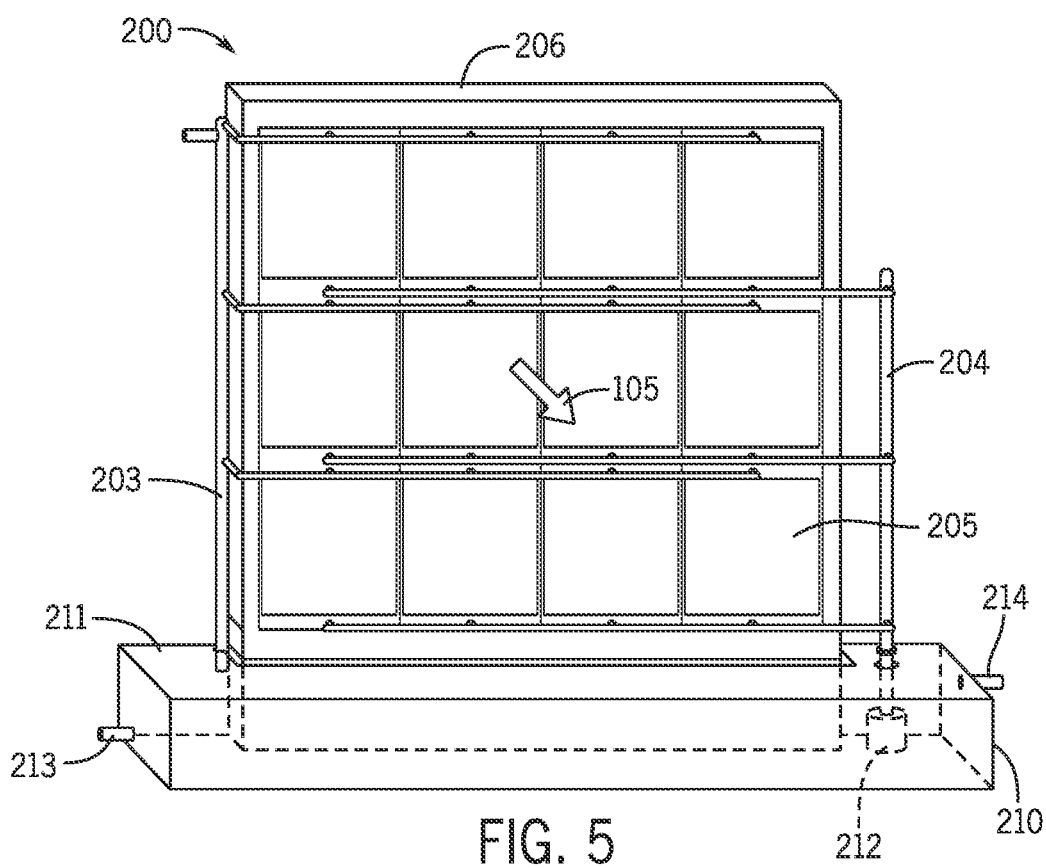
FIG. 5 is an isometric view of a membrane-contactor-based air conditioner, which has an optional water storage tank attached to the bottom of the membrane-contactor-based air conditioner to provide a means of recirculating water to the membrane-contactor panels for the purposes of decreasing the overall usage of water, in accordance with an aspect of the present disclosure.
Figure 21:
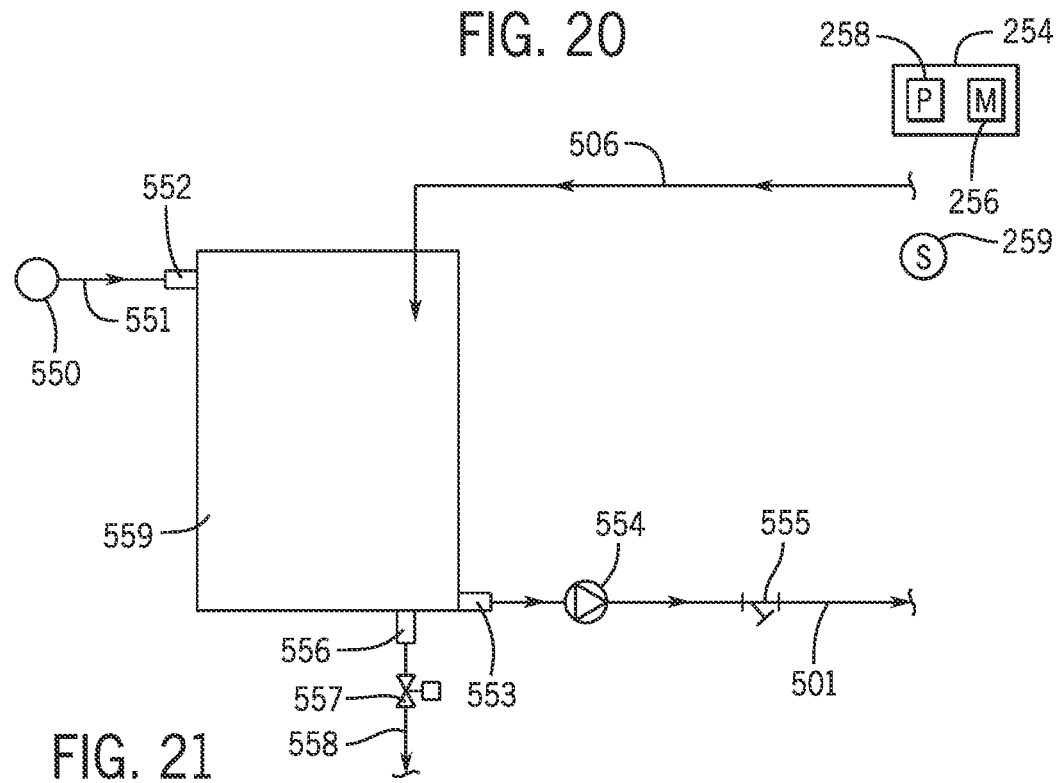
FIG. 21 is a plumbing scheme of an optional water storage tank, wherein a make-up water line connects a water supply to the storage tank, a supply line distributes water from the tank to the membrane-contactor panels, a return line directs water from said membrane-contactor panels back to the storage tank, and a drain line that allows for drainage of the storage tank, in accordance with an aspect of the present disclosure.

Another embodiment of the membrane-contactor-based air conditioner 200, wherein a water storage tank 210 is attached to the base of the membrane-contactor-based air conditioner housing structure 206 is shown in FIG. 5. The water storage tank 210 provides a means to collect the water that is discharged from the matrix of membrane-contactor panels 205 and recirculate it back to the membrane-contactor panels 205. To do so, water flows from the water storage tank 210 up to the supply water distribution manifold 204 through the action of a fluid moving device (e.g. a pump) 212. Once in the supply water distribution manifold 204, the water is distributed out to the membrane-contactor panels 205 and circulates within the hollow fibers of the membrane-contactor panels 205. Water is subsequently discharged from the membrane-contactor panels 205 into the return water collection manifold 203. From the return water collection manifold, the water flows back into the water storage tank 210. As the water follows this circulation pattern, air flow 105 moves through the membrane-contactor panels and is conditioned in the process. Moreover, it should be noted that, as illustrated, FIG. 5 shows a removable cover 211 which is placed on top of the water storage tank 210. In one embodiment, the cover 211 may be left on so as to protect the water source from any contaminants. However, in another embodiment, the cover 211 may be removed so as to leave the water open to the environment. When necessary, water can be drained from the water storage tank to an external on-site drain system through the outlet 213; fresh make-up water can enter from the source inlet 214 in order to compensate for the water which leaves through the evaporation process and draining. Additional details regarding plumbing components for this water storage tank are shown in FIG. 21.

Figure 6:
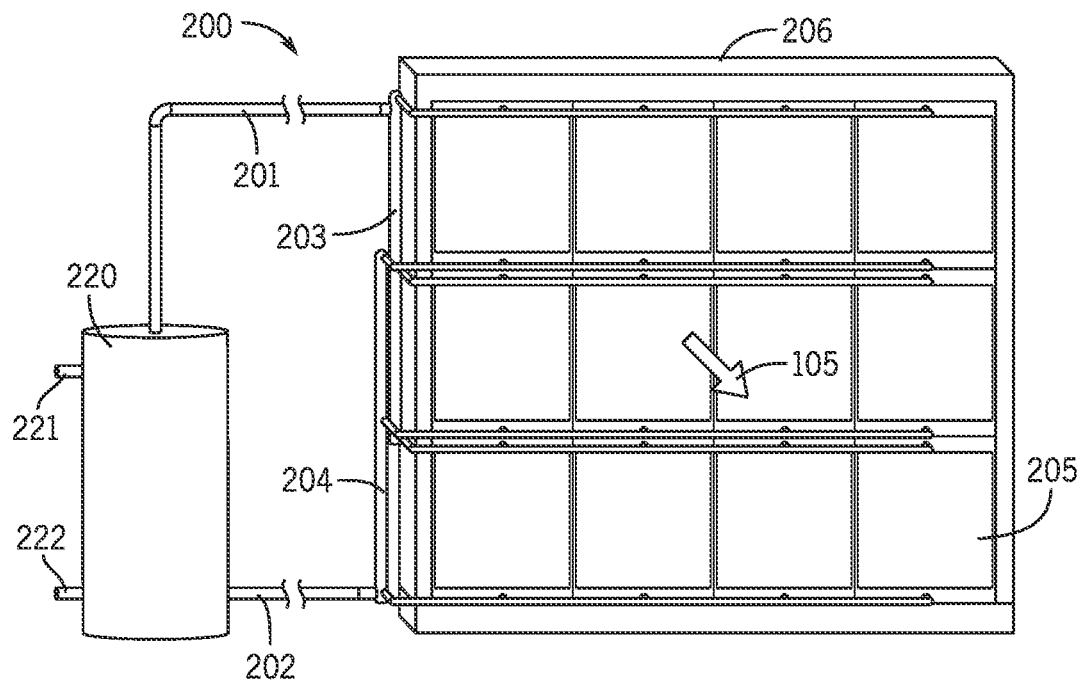
FIG. 6 is an isometric view of a membrane-contactor-based air conditioner, which has an optional water storage tank that is positioned in a remote (i.e. external to) location for the dual purposes of recirculating water to the membrane-contactor panels so as to decrease water usage and minimizing the overall size of the membrane-contactor-based air conditioner, in accordance with an aspect of the present disclosure.

Another embodiment of the membrane-contactor-based air conditioner 200, wherein a remote water storage tank 220 is connected to the membrane-contactor-based air conditioner 200, is shown in FIG. 6. This embodiment is in contrast to the embodiment shown in FIG. 5 where the storage tank is not in a remote location, but rather is attached directly below the membrane-contactor-based air conditioner housing structure 206. Just as with FIG. 5, the connected remote water storage tank 220 in this embodiment provides a means to collect the water that is discharged from the matrix of membrane-contactor panels 205 for potential recirculation. However, the design illustrated in FIG. 6 provides an additional advantage: for membrane-contactor-based air conditioners of identical overall size, there is more surface area available for the matrix of membrane-contactor panels 205 in FIG. 6 compared with FIG. 5 because the remote water storage tank 220 is in a physically different location. Moreover, in this embodiment water flows out of the remote water storage tank 220 through the water inlet port 202 into a supply water distribution manifold 204. The water is then distributed to the matrix of membrane-contactor panels 205 and subsequently discharged into the return water collection manifold 203. From there, the water moves through the water outlet port 201 and back into the remote water storage tank 220. When necessary, water can be drained from the remote water storage tank 220 through the tank water outlet 222 to an external on-site drain system. Fresh make-up water can then enter through the tank water inlet 221 to compensate for the water that is lost. Additional details regarding plumbing components for this remote storage tank are shown in FIG. 21.

Figure 7:
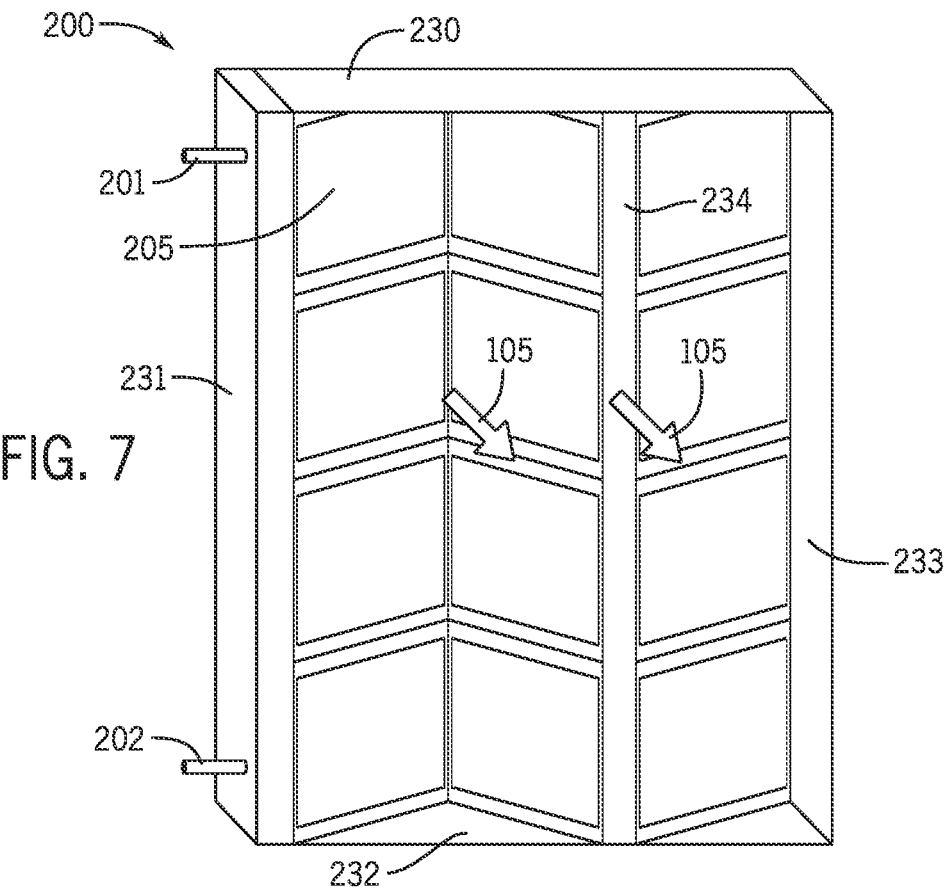
FIG. 7 is an isometric view of a membrane-contactor-based air conditioner, which has the matrix of membrane-contactor panels banked in the vertical plane to increase the available surface-area of the membrane-contactor panels within the overall housing, in accordance with an aspect of the present disclosure.

Another embodiment of the membrane-contactor-based air conditioner 200, wherein the membrane-contactor panels 205 are oriented in a matrix which is V-banked within the vertical plane, is shown in FIG. 7. Membrane-contactor-based air conditioner 200 comprises a housing, bounded by surfaces 230, 231, 232, and 233, which acts to contain and support the membrane-contactor panels 205. Furthermore, there are additional vertical supports 234 that run from the top surface of the membrane-contactor-based air conditioner 230 to the bottom surface of the membrane-contactor-based air conditioner 232. These supports provide further bracing for the membrane-contactor panels and they also seal the interface where two membrane-contactor panels come into contact at an angle. Doing so ensures that the air flow 105 passes through the membrane-contactor panels instead of around them at the connection interfaces. In one embodiment, water enters the membrane-contactor-based air conditioner 200 at the water inlet port 202, is distributed to the membrane-contactor panels in a plurality of ways (as detailed in subsequent figures), and then leaves the membrane-contactor-based air conditioner 200 at the water outlet port 201. In another embodiment, the water inlet port 202 and water outlet port 201 could be reversed or relatively oriented in any possible configuration.

Figure 8:
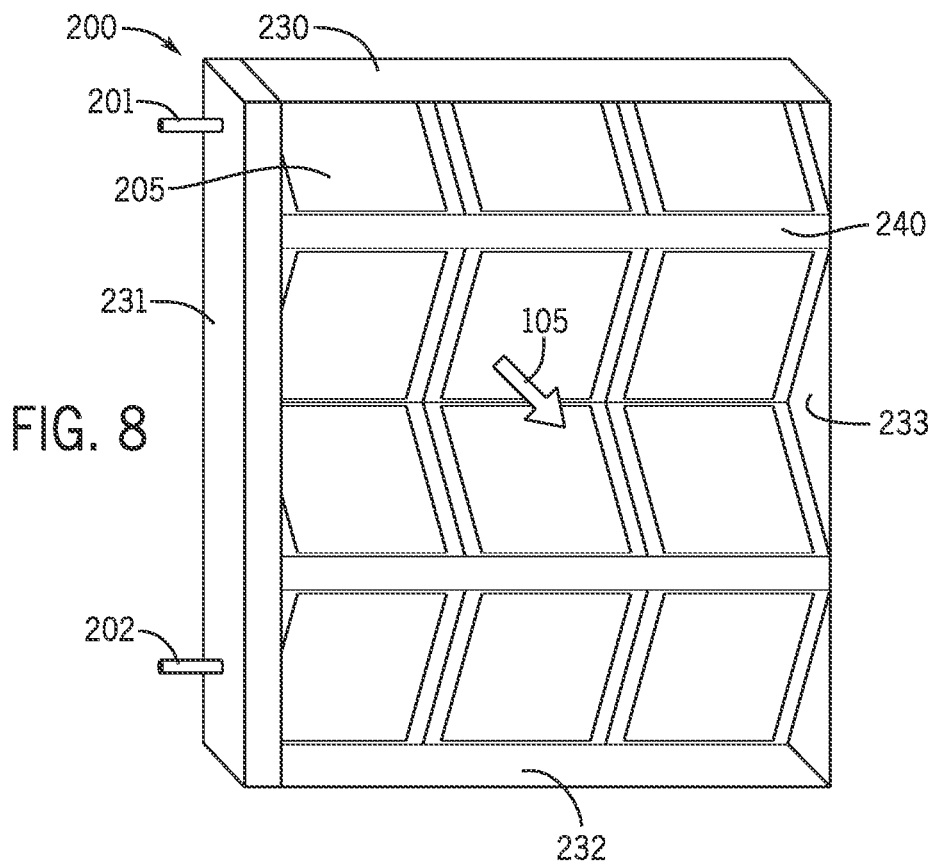
FIG. 8 is an isometric view of a membrane-contactor-based air conditioner shown in FIG. 4, which has the matrix of membrane-contactor panels banked in the horizontal plane to increase the available surface-area of the membrane-contactor panels within the overall housing, in accordance with an aspect of the present disclosure.

FIG. 8 illustrates another embodiment of the membrane-contactor-based air conditioner 200, where the details are the same as for FIG. 7 except that the membrane-contactor panels 205 are V-banked in the horizontal plane. In this embodiment, the supports 240 run widthwise across the unit from the left side 231 to the right side 233 along the interfaces where two membrane-contactor panels come into contact at an angle. In another possible embodiment, the water inlet and water outlet ports are reversed.

Figure 9:
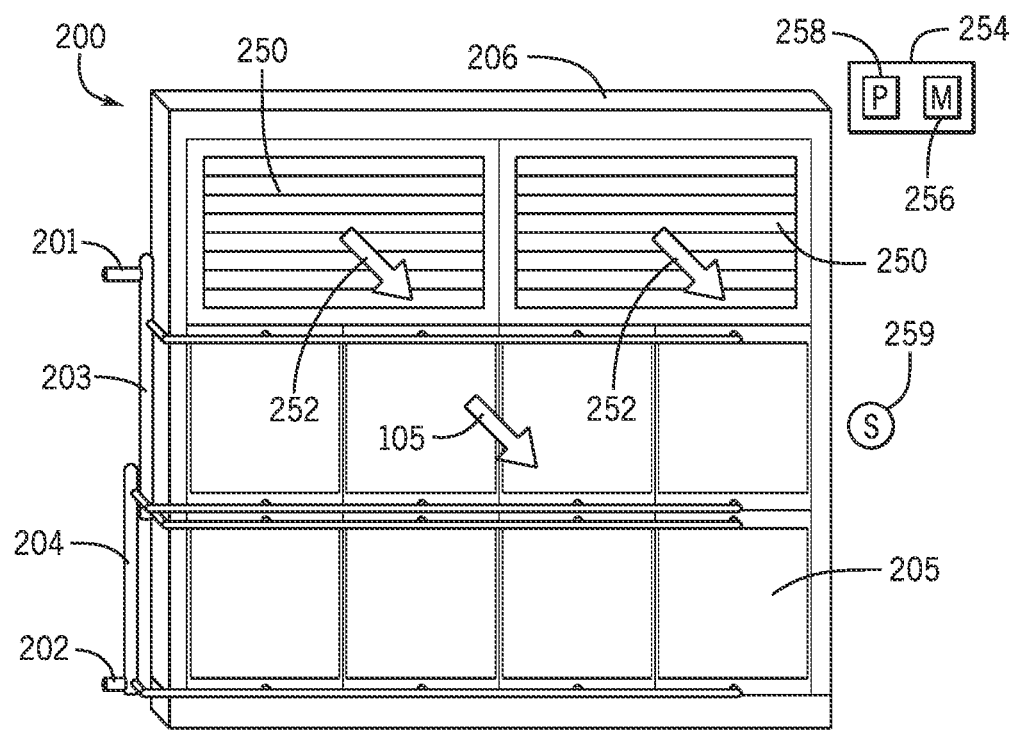
FIG. 9 is an isometric view of a membrane-contactor-based air conditioner, which incorporates the use of horizontal bypass dampers to provide increased control of the air stream passing through the membrane-contactor-based air conditioner, in accordance with an aspect of the present disclosure.

Another embodiment of the membrane-contactor-based air conditioner 200, where air bypass dampers 250 have been incorporated into the housing 206 of the membrane-contactor-based air conditioner, is shown in FIG. 9. As an airstream approaches the membrane-contactor-based air conditioner 200, it now has two paths it can potentially go through. When the air bypass dampers 250 are completely closed, the air flow 105 will move strictly through the matrix of membrane-contactor panels 205, just as it did before. However, as the air bypass dampers 250 are opened, bypass air 252 will pass through the air bypass dampers 250 and exit the membrane-contactor-based air conditioner 200 unconditioned, and the rest of the air 105 will move through the membrane-contactor panels 205. In the instance where the dampers are completely opened, the maximum amount of bypass air 252 (as per the design sizing) will be passing through the air bypass dampers 250 and a reduced air flow 105 will pass through the membrane-contactor panels 205. A controller 254 in FIG. 9 includes a memory 256 and a processor 258. The memory 256 includes instructions stored thereon that, when executed by the processor 258, causes the processor 258 to perform various functions. The controller 254 may be utilized, for example, to open and close the bypass dampers 250. In some embodiments, the controller 254 may be communicatively coupled with a sensor 259 configured to detect one or more operating condition of the air conditioner 200. For example, the sensor 259 may detect an air flow temperature, an air flow rate, an air flow pressure, an air flow humidity, a power consumption of the air conditioner 200, an operating efficiency of the air conditioner 200, a sound of the air conditioner 200, or the like. The controller 254 may receive data indicative of the one or more operating conditions of the air conditioner 200 and determine a position of the bypass dampers 250 based on the sensor data.

Figure 10:
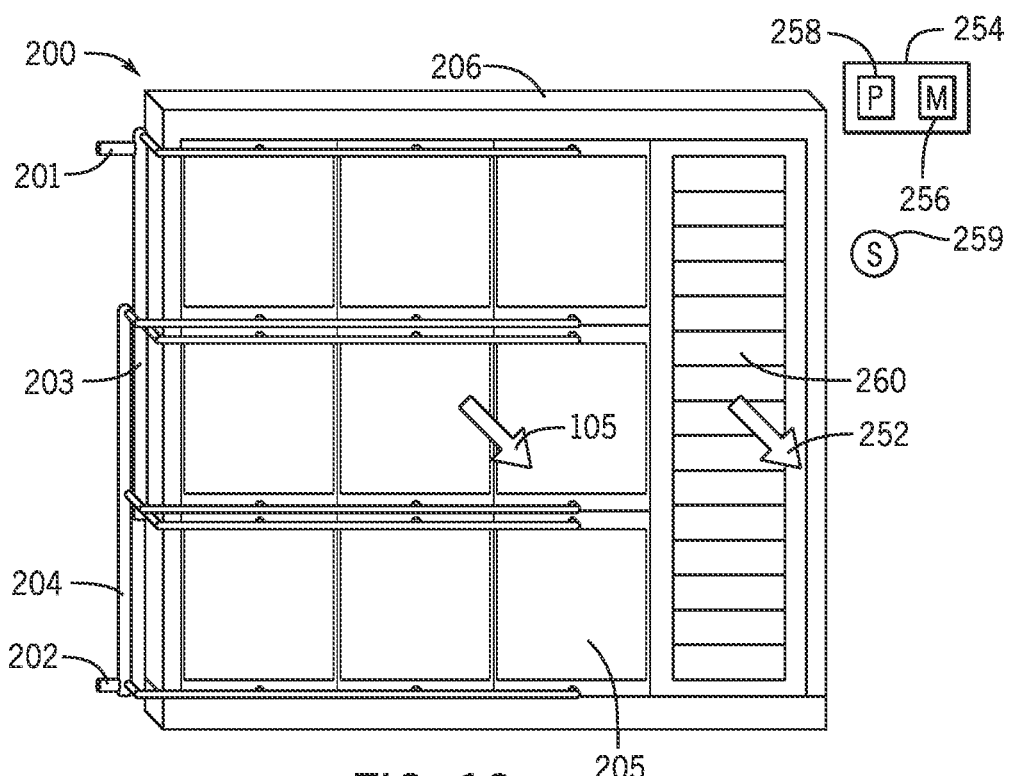
FIG. 10 is an isometric view of a membrane-contactor-based air conditioner, which incorporates the use of vertical bypass dampers to provide increased control of the air stream passing through the membrane-contactor-based air conditioner, in accordance with an aspect of the present disclosure.

In one embodiment, water enters through the water inlet port 202 and up into the supply water distribution manifold 204. The water then circulates through the membrane-contactor panels and out into the return water collection manifold 203. Finally, water leaves through the water outlet port 201. In another possible embodiment, the water inlet and water outlet ports are reversed. Another embodiment of the membrane-contactor-based air conditioner 200, wherein the details are the same as with FIG. 9, except that the air bypass dampers 260 are now positioned vertically, is shown in FIG. 10.

The embodiments shown in FIG. 4 through FIG. 10 are not to be considered as separate designs, but rather as a subset of a plurality of possible features, all of which are not explicitly illustrated, that build off the base design of the embodiment shown in FIG. 4.

Any one feature shown in the above figures may be combined with any other feature to produce a membrane-contactor-based air conditioner that is unique and customized for the desired application. For example, a membrane-contactor-based air conditioner could have an attached storage tank, v-banked membrane-contactor panels in the vertical plane, and vertical bypass dampers, or any combination thereof.

Figure 11:
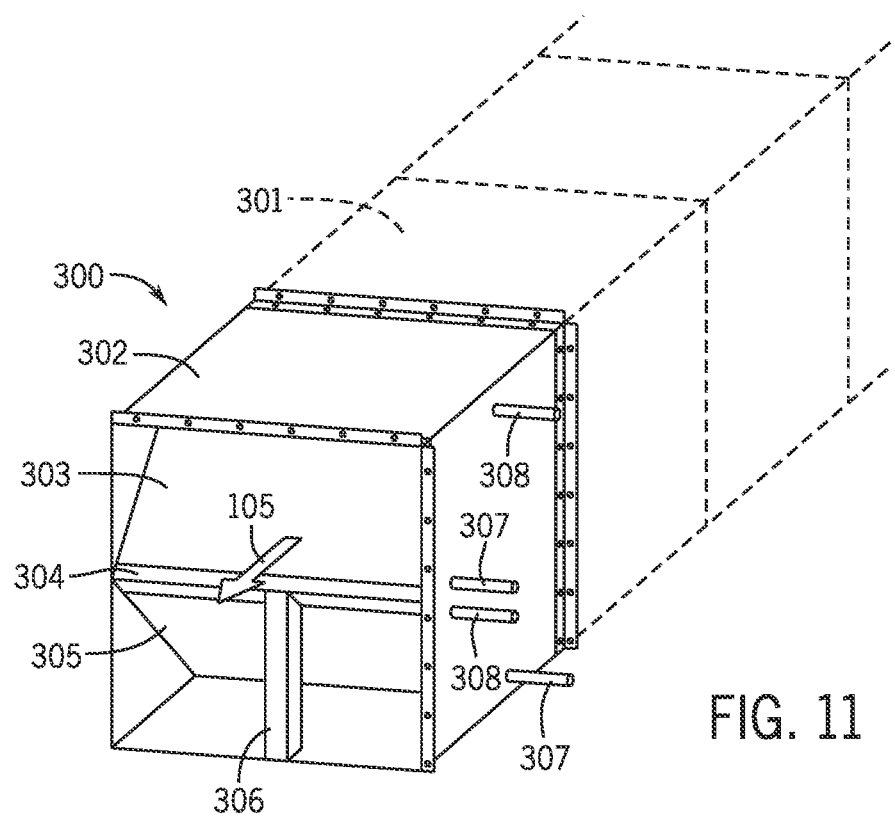
FIG. 11 is an isometric view of a membrane-contactor-based air conditioner, wherein the membrane-contactor-based air conditioner is incorporated into a ducting system, in accordance with an aspect of the present disclosure.

A further embodiment and possible application of the membrane-contactor-based air conditioner 300 within a ducting system 301, in accordance with the present disclosure, is shown in FIG. 11. The membrane-contactor-based air conditioner 300 comprises a duct-housing 302 which contains the membrane-contactor panels 303 and 305, which are oriented in a V-Banked configuration. The air flow 105 moves through ducting system 301 and then subsequently through membrane-contactor panels 303 and 305. As air flow 105 passes through these membrane-contactor panels it is simultaneously cooled and humidified through interaction with the fluid moving within the membrane-contactor panels. In one embodiment, the fluid enters the membrane-contactor panels (303 and 305) through the water inlet ports 307, circulates within the membrane-contactor panels, and then leaves through the water outlet ports 308. In another embodiment, the fluid may instead enter at 308 and leave through 307. Furthermore, in the embodiment shown in FIG. 11, the membrane-contactor panels can be supported by a horizontal support member 304, which serves to brace the cooling membrane-contactor panels and hold them in-place. Moreover, the horizontal support member 304 is itself braced by an optional vertical support member 306, which provides rigidity to the configuration. While this embodiment illustrates the membrane-contactor-based air conditioner 300 within a rectangular ducting system 301, it is not to be limited to rectangular ducting systems alone; rather, the membrane-contactor-based air conditioner 300 may be applied within any ducting system of any shape, material, orientation, or description.

Figure 12:
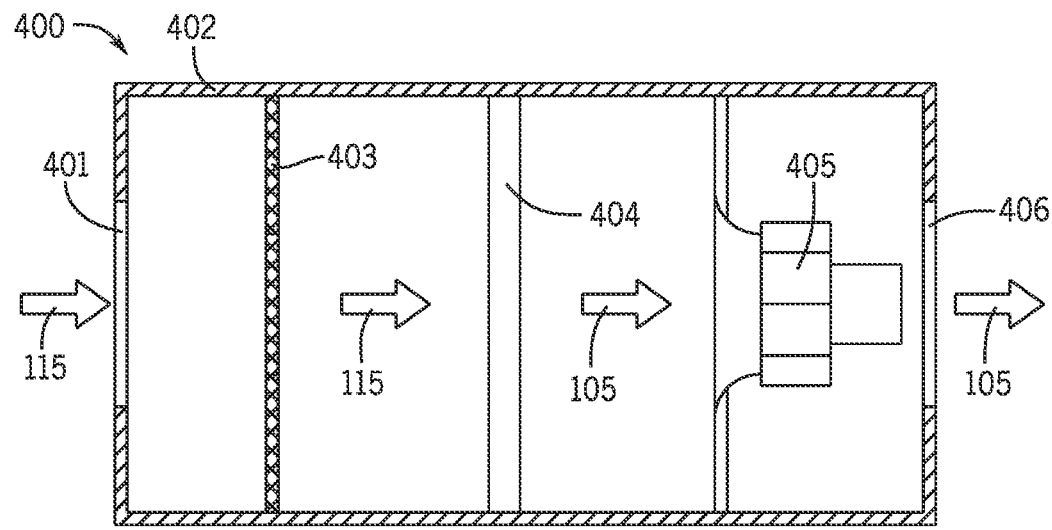
FIG. 12 is an illustration of a membrane-contactor-based air conditioner, wherein the membrane-contactor-based air conditioner is incorporated within an air handling unit (AHU), in accordance with an aspect of the present disclosure.

A further embodiment and possible application of the membrane-contactor-based air conditioner of the present disclosure, wherein the membrane-contactor-based air conditioner 404 is incorporated within an air handling unit (AHU) 400, is shown in FIG. 12. In this embodiment, the air handling unit is defined by its outer casing 402. Unconditioned air flow 115 enters through opening 401, moves through a set of filters 403, and then enters the membrane-contactor-based air conditioner 404. As the air passes through the membrane-contactor-based air conditioner 404 the air is cooled and/or humidified and exits the membrane-contactor-based air conditioner as conditioned air 105. Next, the conditioned air is drawn into an air movement device (e.g. a fan) 405, and then exits the AHU 400 through opening 406. While just one membrane-contactor-based air conditioner 404 is shown here, which stretches from side-to-side of the AHU 400, other configurations are possible. These include, but are not limited to, two membrane-contactor-based air conditioners in a straight side-by-side arrangement, three membrane-contactor-based air conditioners in a straight side-by-side arrangement, and so on. Moreover, a plurality of membrane-contactor-based air conditioners can be installed in series relative to the air flow direction.

Figure 13:
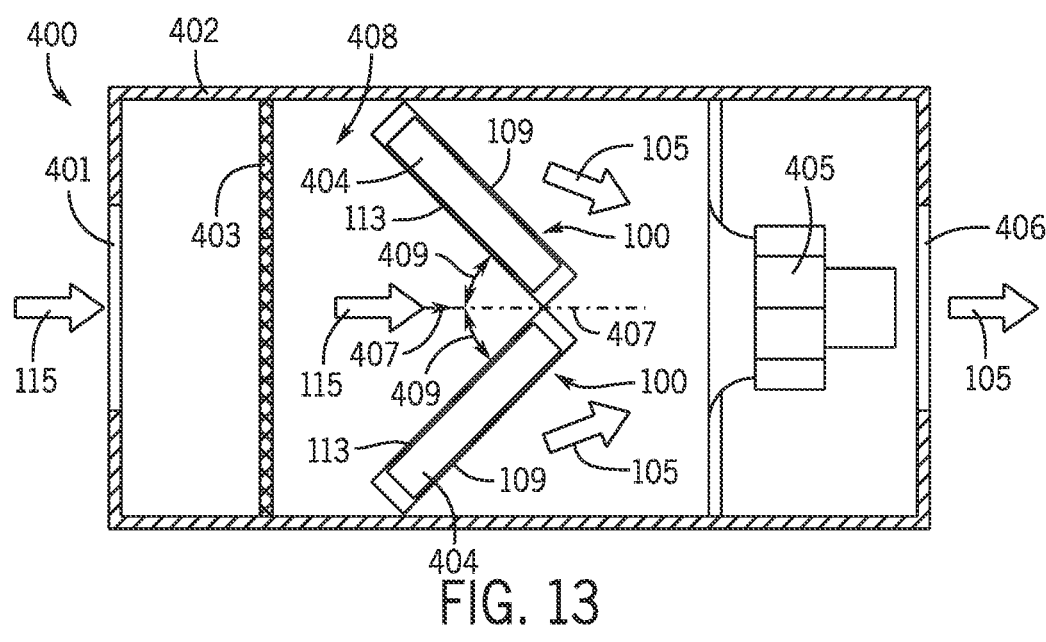
FIG. 13 is an illustration of a membrane-contactor-based air conditioner, wherein the membrane-contactor-based air conditioner is oriented in a V-banked array within an air handling unit (AHU), in accordance with an aspect of the present disclosure.

A further embodiment and possible application of the membrane-contactor-based air conditioner of the present disclosure wherein, just as for FIG. 12, the membrane-contactor-based air conditioner 404 is incorporated into an air handling unit (AHU) 400, is shown in FIG. 13. The difference between the embodiment shown in FIG. 13 and the embodiment shown in FIG. 12 is that the membrane-contactor-based air conditioners 404 of the embodiment shown in FIG. 13 are banked at angles and meet at a common interface.

For example, each membrane-contactor-based air conditioner 404 in FIG. 13 may include one or more membrane-contactor panels 100 (e.g., illustrated in detail in FIGS. 1 and 2). As shown, the incoming (or unconditioned) air flow 115 is directed in an airflow direction 407 through a flow path 407 defined by the outer casing 402 (or enclosure) of the AHU 400. It should be noted that the airflow direction 407 may correspond to an average or general airflow direction through the flow path 408, and that travel of certain individual particles of the air flow 115 may differ. As shown, each membrane-contactor panel 100 may be oriented at an oblique angle 409 relative to the airflow direction 407. For example, the upstream faces 113 of the membrane-contactor panels 100 may be oriented at the oblique angle 409 relative to the airflow direction 407. In the illustrated embodiment, the downstream faces 109 of the membrane-contactor panels 100 are also oriented at the oblique angles 409 relative to the airflow direction 407. Orientation of the membrane-contactor panels 100 at the oblique angles 409 relative to the airflow direction 407 (or otherwise V-banked) is also illustrated in at least FIGS. 7, 8, 11, and 14 of the present disclosure. It should be understood that the presently disclosed AHU 400 example in FIG. 13 is non-limiting, namely, orienting the membrane-contactor panels 100 at the oblique angle 409 relative to the airflow direction 407 is applicable in the context of other air conditioners, including but not limited to diffusers, induction displacement units, terminal units, localized air coolers, fan walls, systems for data centers, and building systems.

The benefit of placing two banked membrane-contactor-based air conditioners 404 within the AHU 400 (e.g., at the oblique angles 409) is that it allows for an increase in the surface area of the membrane-contactor-panels 100. Just as in the embodiment shown in FIG. 12, the unconditioned air flow 115 enters the membrane-contactor-based air conditioner 400 and passes through the set of filters 403. It should be noted that the filters 403 may not include a mist eliminator. That is, the illustrated embodiment may exclude a mist eliminator in accordance with the present disclosure. Although mist eliminators may be utilized in traditional evaporative cooling systems due to associated water carryover, said mist eliminators may increase a pressure drop (thereby increasing power consumption and reducing efficiency) of traditional systems. Disclosed systems are not susceptible to water carryover and, thus, do not require mist eliminators.

After the airstream 115 passes through the membrane-contactor-based air conditioner(s) 404 and the filter(s) 403, the airstream 115 is then split, with part of the air passing through one banked membrane-contactor-based air conditioner, and the rest of the air going through the other. After exiting the membrane-contactor-based air conditioners 404, the now conditioned air flow 105 is pulled into the air movement device 405 and is then discharged from the AHU 400 through opening 406.

Figure 14:
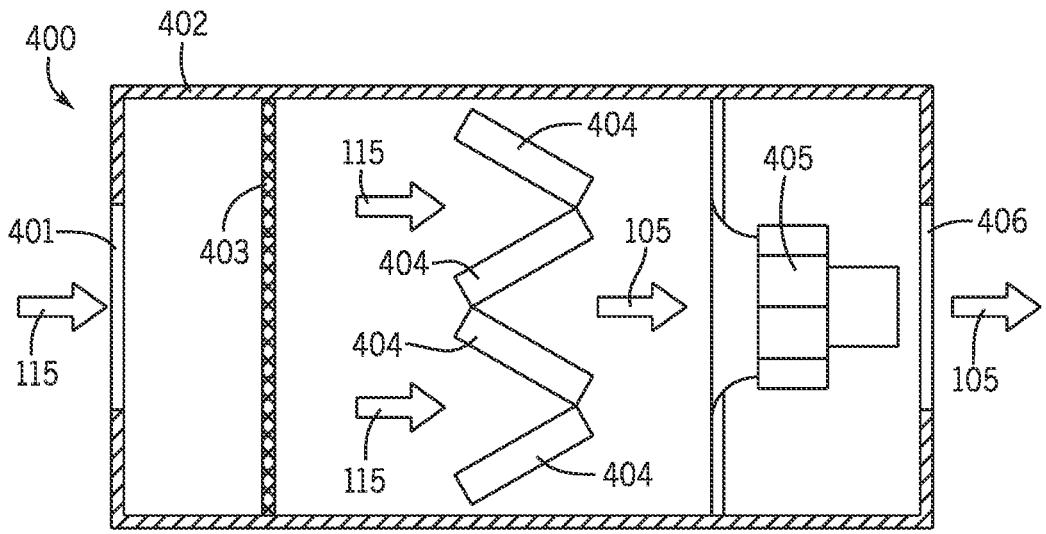
FIG. 14 is an illustration of a membrane-contactor-based air conditioner, wherein the membrane-contactor-based air conditioner is oriented in multiple V-banked arrays within an air handling unit (AHU), in accordance with an aspect of the present disclosure.
Figure 15:
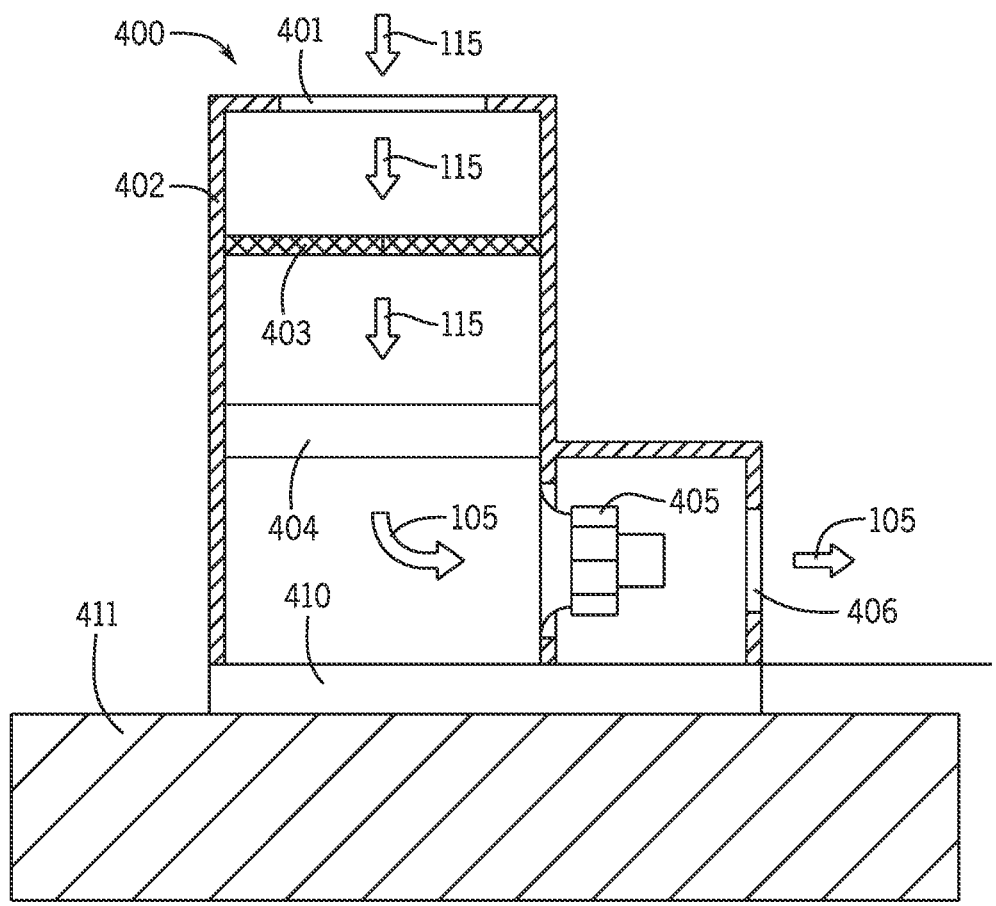
FIG. 15 is an illustration of a membrane-contactor-based air conditioner, wherein the membrane-contactor-based air conditioner is incorporated into an air handling unit (AHU) in a way such that the air flow direction through the membrane-contactor panel is parallel to the direction of gravity which highlights the membrane-contactor-based air conditioner's ability to be oriented in any direction, in accordance with an aspect of the present disclosure.

A further embodiment and possible application of the membrane-contactor-based air conditioners 404 being placed within an air handling unit (AHU) 400 is shown in FIG. 14. The difference between the embodiment shown in FIG. 14 and the embodiment shown in FIG. 13 is that the embodiment shown in FIG. 14 includes multiple V-banked membrane-contactor-based air conditioners 404 placed within an air handling unit 400.

A further embodiment and possible application of the membrane-contactor-based air conditioner 404 being placed within an air handling unit (AHU) 400 is shown in FIG. 1n this embodiment, the AHU 400 is in a vertical orientation with the base 410 of the AHU 400 sitting on the ground/foundation 411. Moreover, the unconditioned air flow 115 that leads into the membrane-contactor-based air conditioner 404 is parallel to the direction of gravity. The conditioned air flow 105 exits the membrane-contactor-based air conditioner 404 parallel to the direction of gravity and is then pulled towards the rightward direction by the air moving device (e.g. a fan) 405 and is discharged through the opening 406. This vertical orientation of the AHU 400 demonstrates that the membrane-contactor-based air conditioner may be oriented such that its face area is orthogonal to the direction of gravity.

The embodiments of the present disclosure wherein the membrane-contactor-based air conditioner(s) 404 is/are incorporated within an air handling unit (AHU) are not to be limited to those designs shown in FIG. 12 through FIG. 15. Rather, these figures illustrate possible applications, all of which can be expanded and built upon endlessly. Furthermore, these figures demonstrate that the membrane-contactor-based air conditioner can operate in any orientation, including when its face area is parallel to the direction of gravity, orthogonal to the direction of gravity, or any orientation there between.

Figure 16:
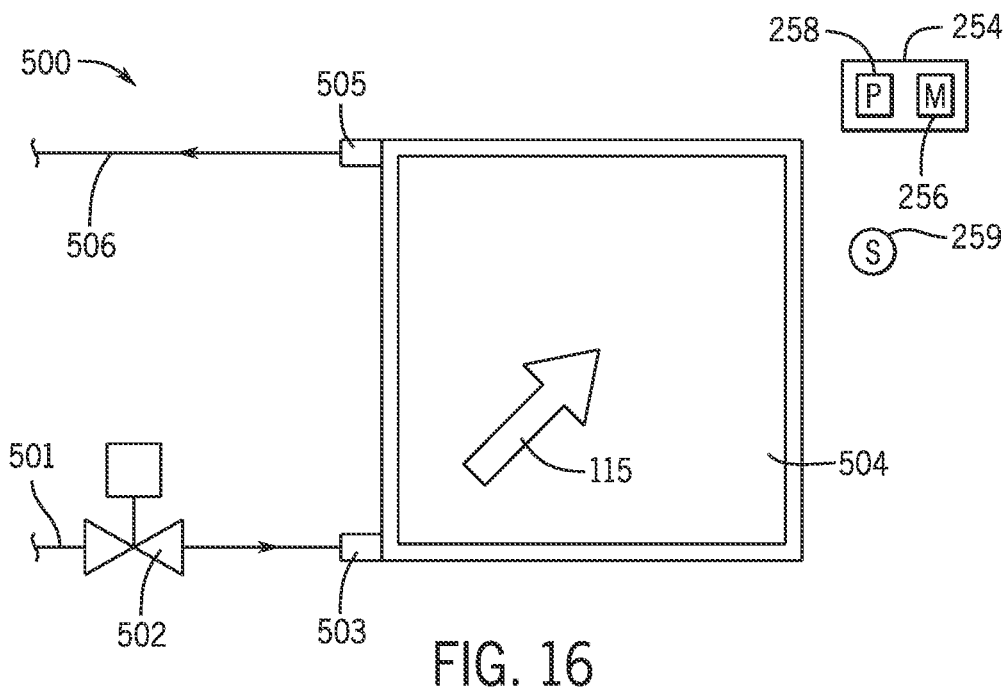
FIG. 16 is a diagram of a possible plumbing scheme of an individual membrane-contactor panel, wherein a single supply water line and a single return water line is routed to and from the individual membrane-contactor panel, respectively, in accordance with an aspect of the present disclosure.
Figure 18:
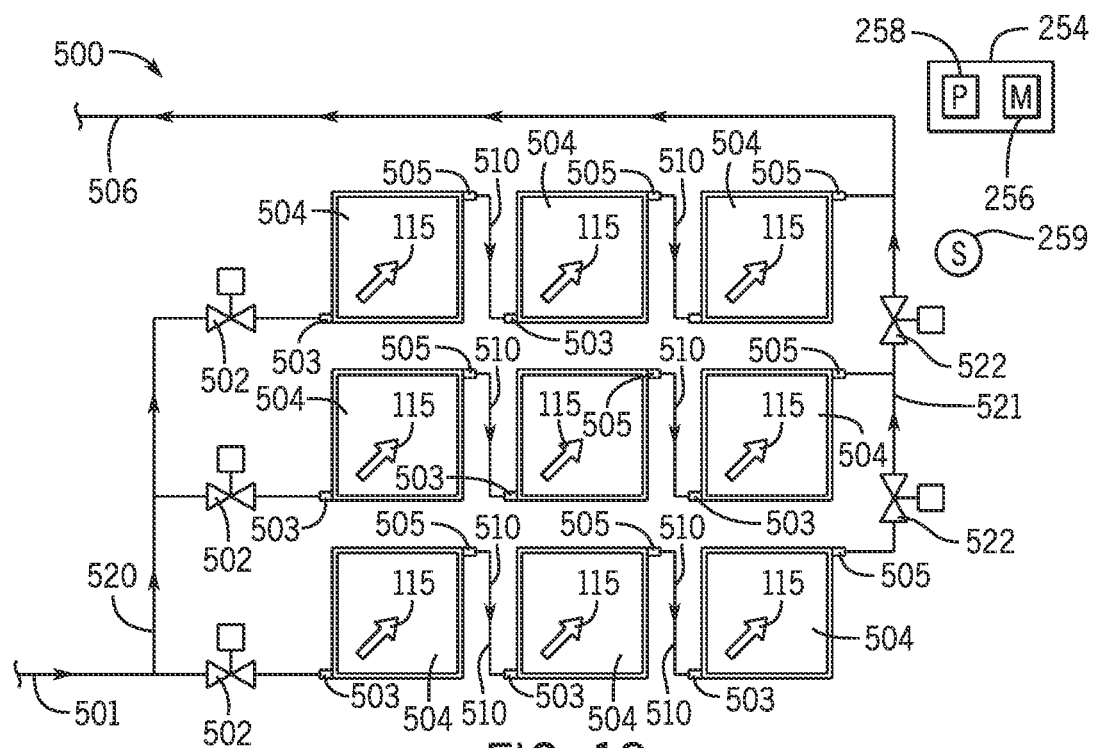
FIG. 18 is a diagram of a possible plumbing scheme of a plurality of membrane-contactor panels routed both in series and in parallel, wherein a supply distribution manifold delivers water to the plurality of membrane-contactor panels, and a return water manifold discharges water from the plurality of membrane-contactor panels for recirculation and/or drainage, the possible plumbing scheme allowing for each individual group of membrane-contactor panels to be selectively activated and deactivated, in accordance with an aspect of the present disclosure.

A plumbing system 500 for an individual membrane-contactor panel 504 is shown in FIG. 16. The individual membrane-contactor panel 504 may be installed in any of the aforementioned embodiments of the present disclosure. The plumbing system comprises a water supply line 501 routed to the water inlet port 503 of the individual membrane-contactor panel 504, a water return line 506 routed from the water outlet port 505 of the individual membrane-contactor panel 504, and a control valve 502. The water supply line 501 distributes water that is pumped from an upstream water supply source (not shown in FIG. 16) to the individual membrane-contactor panel 504. Water flows through the hollow membranes residing in the membrane-contactor panel (in the general direction starting from the water inlet port 503 to the water outlet port 505), and comes in contact with dry, warm process air 115 that is directed through the face of the membrane-contactor panel. The intake air 115 flows through the face of the membrane-contactor panel 504 and is subsequently cooled and/or humidified. The water return line 506 discharges the residual volume of water that has not been evaporated to an optional integral or external storage tank for recirculation and/or drainage. The control valve 502 regulates the fluid flow rate of the plumbing circuit and may be installed at the water supply line 501 (as shown in FIG. 18) or the water return line 506. The controller 254 may operate to control a position of the valve 502 (e.g., an open position, a partially open position, a closed position). Other appurtenances adjunct to the plumbing system 500 including, but not limited to, water filtration devices, water meters, water hammer arrestors, backflow preventers, as well as instrumentation devices, may be included into the system to meet specific application requirements.

Figure 17:
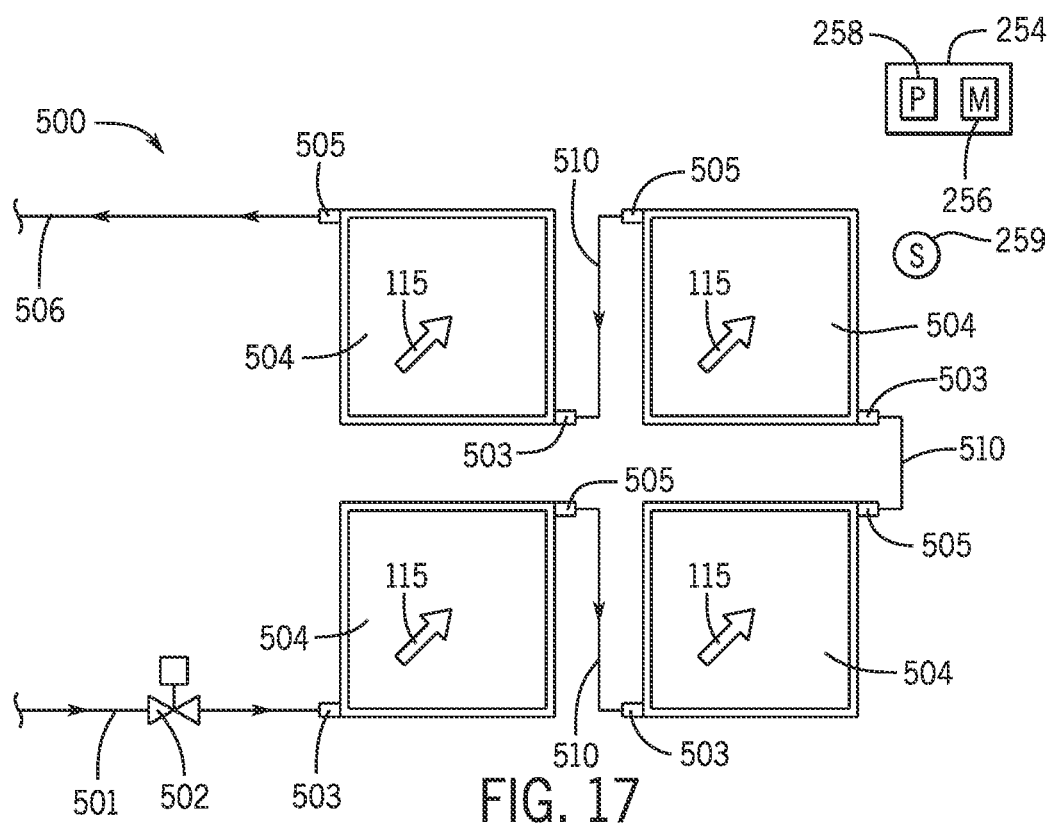
FIG. 17 is a diagram of a possible plumbing scheme of a plurality of membrane-contactor panels routed in series, wherein a single supply water line and a single return water line is routed to and from the membrane-contactor panels, respectively, in accordance with an aspect of the present disclosure.

A possible plumbing scheme for a plurality of individual membrane-contactor panels 504 is shown in FIG. 17. In this embodiment, the membrane-contactor panels 504 are plumbed in series such that the residual water volumes discharged from the water outlet port 505 of one membrane-contactor panel enters the water inlet port 503 of a subsequent membrane-contactor panel using intermediate piping 510. The control valve 502 regulates fluid flow to the entire series of membrane-contactor panels and may be located at either the water supply line 501 (as shown in FIG. 16) or the water return line 502. As previously described, the controller 254 may control the control valve 502 to regulate fluid flow. The intake air 115 flows through the face of each membrane-contactor panel 504 and is subsequently cooled and/or humidified.

A further possible plumbing scheme for a plurality of individual membrane-contactor panels 504 is shown in FIG. 18. In this embodiment, membrane-contactor panels 504 are plumbed both in series (as illustrated in FIG. 17) and in parallel such that a multitude of control valves 502 regulate flow to distinct groups of membrane-contactor panels within the matrix. The controller 254 may control the multitude of control valves 502 collectively or independently. Each group of membrane-contactor panels can be selectively activated to provide cooling needs. The water supply line 501 is connected to a supply water distribution manifold 520 that directs water to the water inlet ports 503 of each group of membrane-contactor panels. Within each group of membrane-contactor panels, water discharged from the water outlet port 505 of one membrane-contactor panel enters the water inlet port 503 of a subsequent membrane-contactor panel within the series using intermediate piping 510. A return water collection manifold 521 directs residual water volumes from each group of membrane-contactor panels to the water return line 506 for eventual recirculation and/or drainage. The control valves 502 may be located at outlet connections of the supply water distribution manifold 520, or the inlet connections of the return water collection manifold 521. Isolation valves 522 may be included to provide flow logic and prevent backflow to certain membrane-contactor panel groups. The intake air 115 flows through the face of each membrane-contactor panel 504 and is subsequently cooled and/or humidified.

Figure 19:
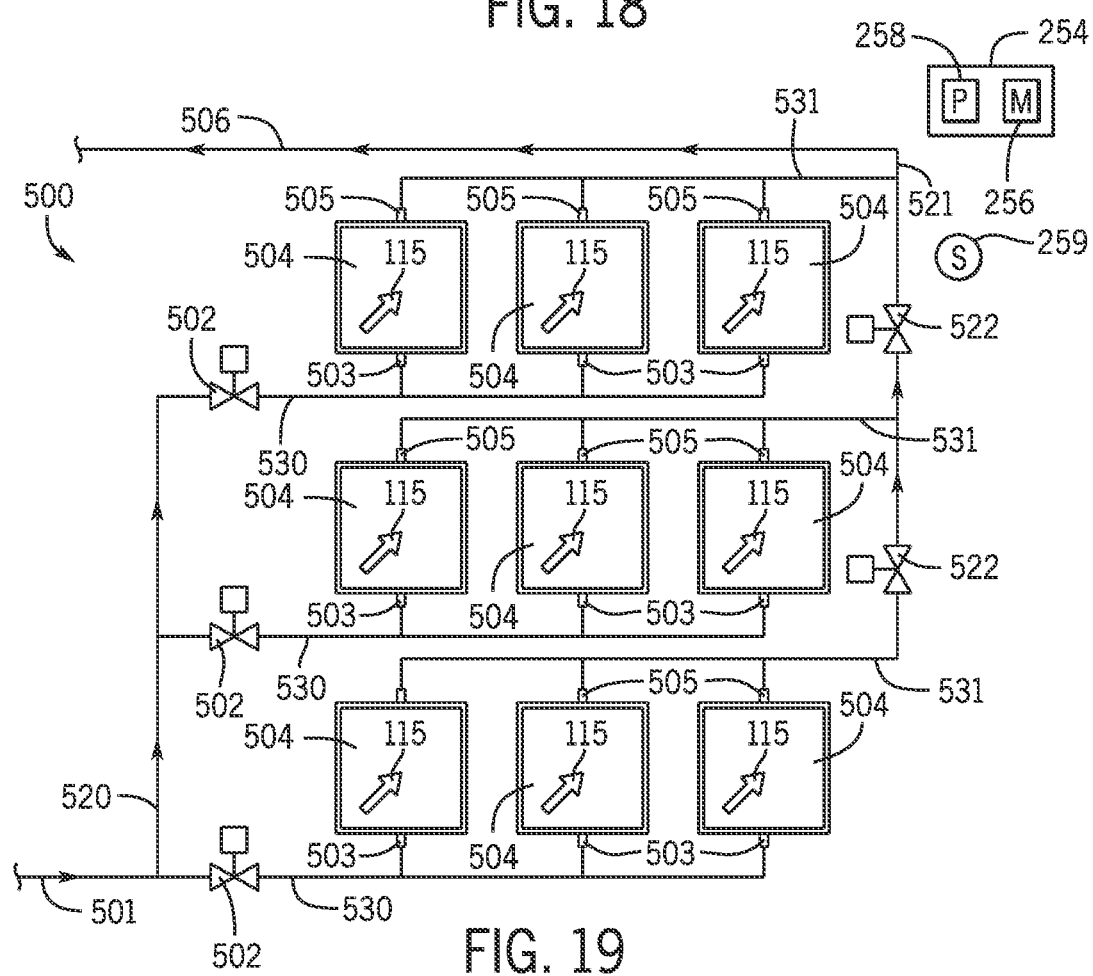
FIG. 19 is a diagram of a possible plumbing scheme of a plurality of membrane-contactor panels routed in parallel, wherein a common supply distribution manifold delivers water to a plurality of supply water branch piping which in turn delivers water to the plurality of membrane-contactor panels, and wherein a plurality of return water branch piping receives return water from the plurality of membrane-contactor panels and discharges it to a common return water manifold for eventual recirculation and/or drainage, the possible plumbing scheme allowing for each individual group of membrane-contactor panels to be selectively activated and deactivated, in accordance with an aspect of the present disclosure.

A further possible plumbing scheme for a plurality of individual membrane-contactor panels 504 is shown in FIG. 19. In this embodiment, the membrane-contactor panels 504 are plumbed in parallel such that a multitude of control valves 502 (and the controller 254 configured to control the multitude of control valves 502) regulate flow to distinct groups of membrane-contactor panels within the matrix. In addition to the previously mentioned supply water distribution manifold 520 and return water collection manifold 521 shown in FIG. 18. FIG. 19 illustrates the use of branch piping (530 and 531) to direct water to and from each membrane-contactor panel group, respectively. Branch piping 530 is routed from the supply water distribution manifold 520 to the water inlet port 503 of each membrane-contactor panel 504 within a designated group. Branch piping 531 is routed from the water outlet port 505 of each membrane-contactor panel 504 within a designated group to the return water collection manifold 521. This plumbing scheme represents the use of reverse return piping, wherein the overall system flow is divided into approximately equal streams that pass through the membrane-contactor panels 504. The control valves 502 may be located at outlet connections of the supply water distribution manifold 520, or the inlet connections of the return water collection manifold 521. Optional balancing valves may be used in the system to fine-tune flow rates as needed. Isolation valves 522 may be included to provide flow logic and prevent backflow to certain membrane-contactor panel groups. The intake air 115 flows through the face of each membrane-contactor panel 504 and is subsequently cooled and/or humidified.

Figure 20:
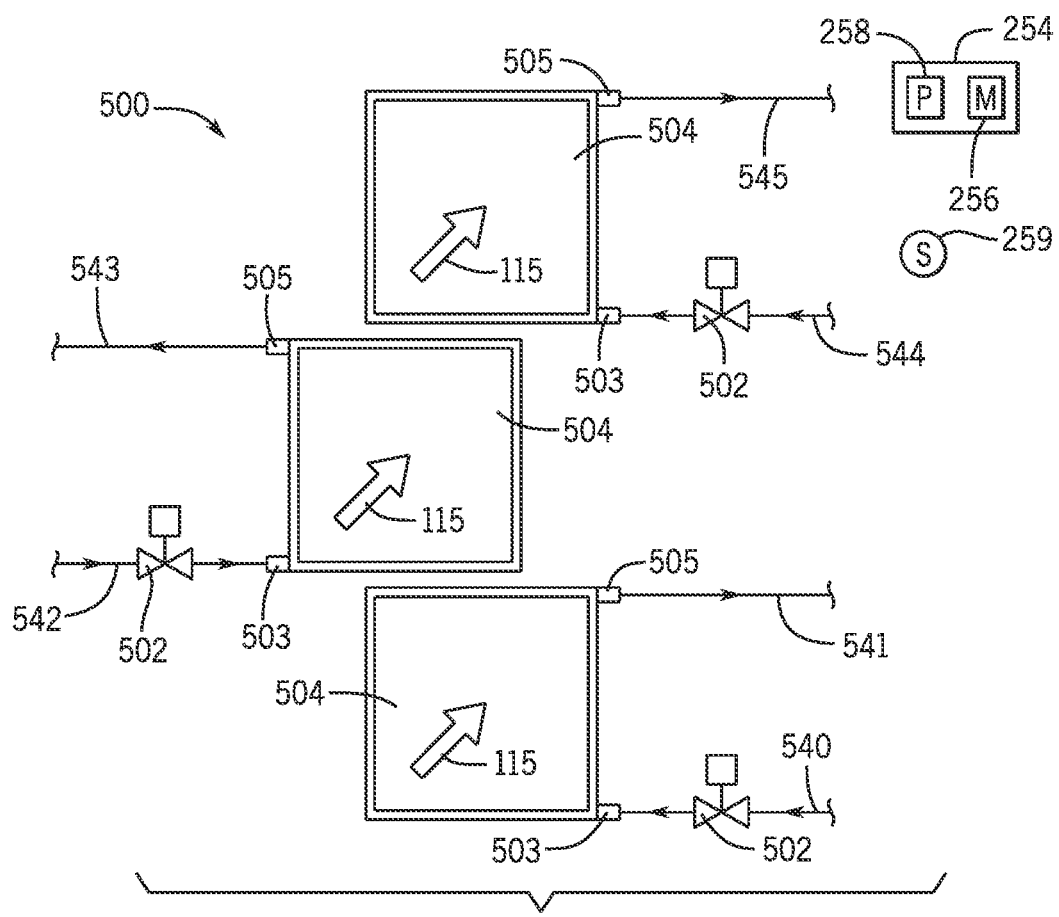
FIG. 20 is a diagram of a possible plumbing scheme of a plurality of membrane-contactor panels that are individually routed to independent water supply sources and possible independent drainage sources, the possible plumbing scheme allowing for each individual membrane-contactor panel to be selectively activated and deactivated, in accordance with an aspect of the present disclosure.

A further possible plumbing scheme for a plurality of individual membrane-contactor panels 504 is shown in FIG. 20. In this embodiment, each membrane-contactor panel 504 is plumbed to its own water supply source. Separate supply lines (540, 542, 544) direct water from separate water supply sources to each membrane-contactor panel 504; separate return lines (541, 543, 545) direct residual water volumes from membrane-contactor panels 504 to individual or common reservoirs for recirculation and/or drainage. A multitude of independent control valves 502 regulate the water flow of each membrane-contactor panel 504, allowing for selective activation of each membrane-contactor panel 504 for application-specific cooling needs. The intake air 115 flows through the face of each membrane-contactor panel 504 and is subsequently cooled and/or humidified. For example, in an embodiment with two of the membrane-contactor panels 504 and, thus, two valves 502, both valves 502 may be controlled by the controller 254 to an open position, both valves 502 may be controlled by the controller 254 to a closed position, and one valve 502 may be controlled by the controller 254 to an open position while the other valve 502 may be controlled by the controller 254 to a closed position. As previously described, the controller 254 may actuate the valves 502 based on data feedback from the sensor 259. Additionally or alternatively, the controller 254 may receive an input (e.g., from an operator) and control the valves 502 based on the input.

All plumbing schemes described herein can be infinitely scaled to match the total quantity of membrane-contactor panels within the system. The flexibility and ease of adding or removing membrane-contactor panels, and combining and/or interchanging plumbing schemes allows for autonomous infinite capacity and precise demand-matching control strategies.

An optional water storage tank 559 that may be integral to the membrane-contactor-based air conditioner (as shown in FIG. 5) or located at a remote location (as shown in FIG. 6) is shown in FIG. 21. A supply water source 550 is fed to the inlet 552 of the storage tank 559 by a makeup water line 551. The makeup water line 551 may be connected directly to the membrane-contactor supply line 501 if the water storage tank 559 is not required. Makeup water is required for all plumbing schemes described above to maintain a continuous evaporative cooling process. When cooling is required, a fluid moving device (e.g. sump pump or in-line pump 554) is turned on (e.g., by the controller 254), allowing water from the storage tank 559 to exit through the outlet 553 and flow through the supply line 501 to downstream membrane-contactor panels. An optional strainer 555 or other water filtration and/or treatment components may be installed to improve quality of water supplied to membrane-contactor panels. In recirculation systems, a return line 506 directs residual water volumes discharged from membrane-contactor panels back into the water storage tank 559 for reuse or mixing with makeup water. The water storage tank can be drained through a drainage outlet 556 into a drain line 558 by opening a drain control valve 557 (e.g., via the controller 254). An example of a situation requiring tank drainage includes when the concentration of dissolve solids accumulated in the plumbing system needs to be reduced.

Figure 22:
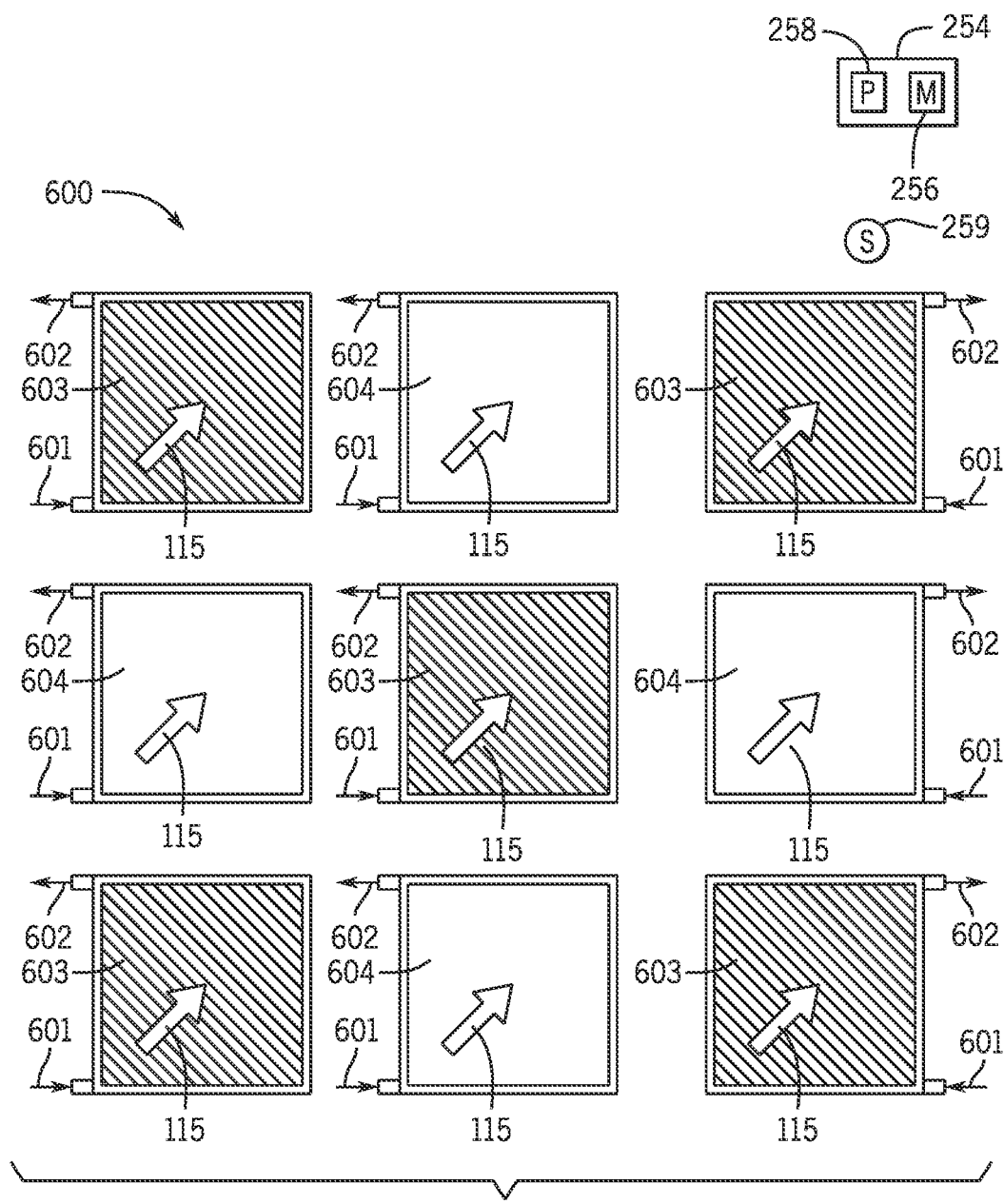
FIG. 22 is a schematic that illustrates a matrix of membrane-contactor panels, wherein certain membrane-contactor panels are selectively activated to condition air, in accordance with an aspect of the present disclosure.

A control scheme of a plurality of individual membrane-contactor panels 504 is shown in FIG. 22. For the cooling system 600, each membrane-contactor panel 504 is individually plumbed to its own supply line 601, return line 602, and control valve 502, similar to the embodiment shown in FIG. 20. Since control valves 502 can be wired independently of one another, and since each membrane-contactor panel 504 is routed to its own water supply, selective membrane-contactor panels 504 can be activated or deactivated (e.g., by the controller 254). FIG. 22 shows both activated membrane-contactor panels 603 and deactivated membrane-contactor panels 604. In an embodiment with two membrane-contactor panels 603, for example, the controller 254 may control both membrane-contactor panels 603 to an activated (e.g., via valves, such as the valves 502 in FIG. 20), both membrane-contactor panels 603 to deactivated configurations (e.g., via valves, such as the valves 502 in FIG. 20), and one membrane-contactor panel 603 to an activated configuration and the other membrane-contactor panel 603 to a deactivated configuration (e.g., via valves, such as the valves 502 in FIG. 20). Furthermore, an activation sequence control scheme can be automated such that the membrane-contactor panels 504 can be activated in either a synchronous or an asynchronous manner, subject to predetermined control system delays or setpoint configurations. Membrane-contactor panels can also be installed in different zones within an enclosed space or volume to provide area-focused air conditioning.

Figure 23:
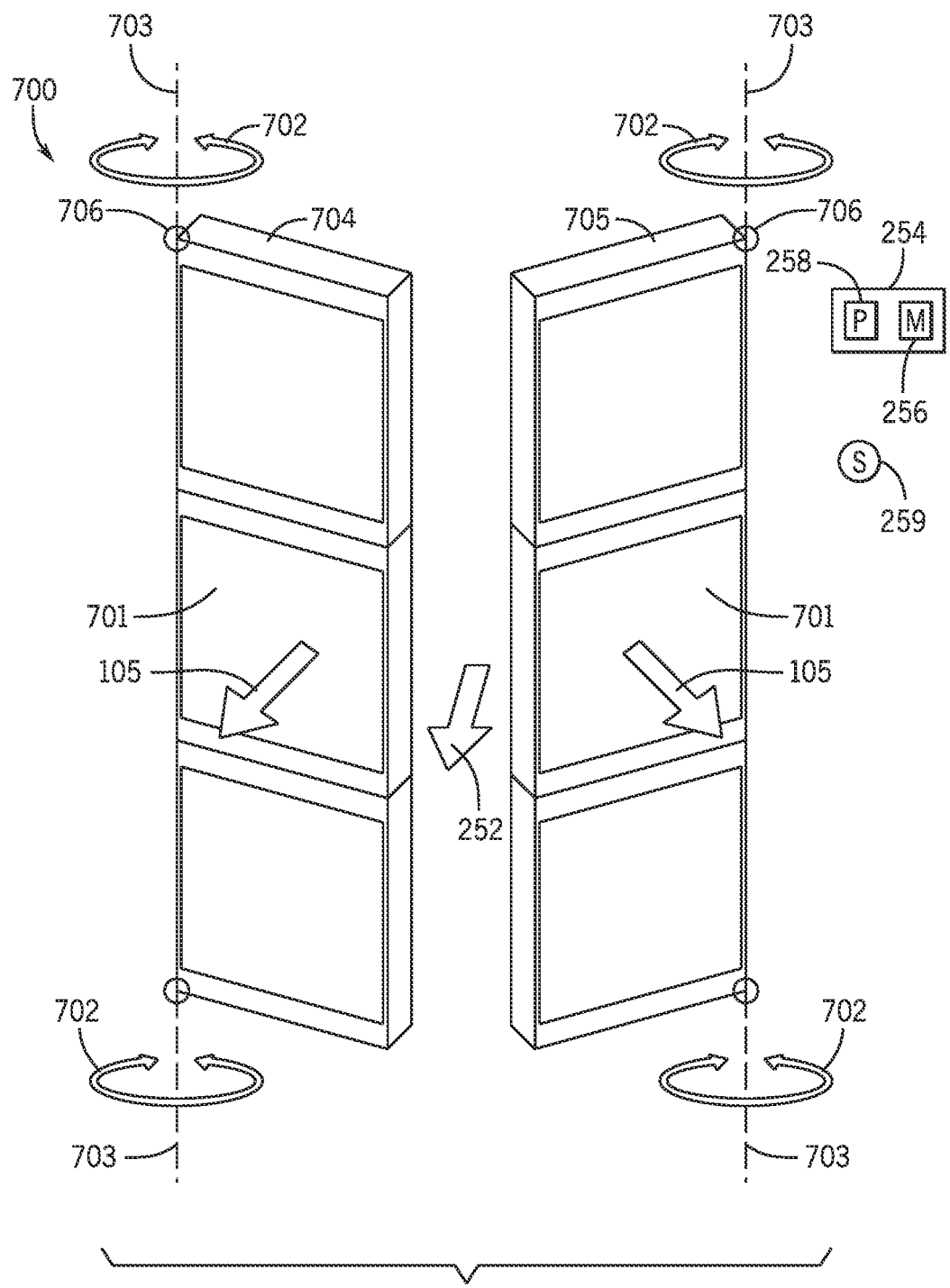
FIG. 23 is an illustration of a possible feature of a membrane-contactor-based air conditioner, wherein two or more physically distinct matrices of membrane-contactor panels meet at a common interface(s) and each of which are hinged to an axis permitting rotation about said axis through the use of an actuating device, in accordance with an aspect of the present disclosure.

A potential feature of the membrane-contactor-based air conditioner 700, wherein two physically distinct matrices (704 and 705) of membrane-contactor panels 701 are hinged to a rotation axis 703, is shown in FIG. 23. Through the use of any potential actuating device (e.g., such as motors 706 controlled by the controller 254), the matrices (704 and 705) are able to rotate 702 about the axis 703. This feature enables different airpaths to exist within the overall membrane-contactor-based air conditioner 700. When the matrices (704 and 705) are rotated such that they are touching at their common interface, the gap shown in FIG. 23 will be closed, and all air will pass through the membrane-contactor panels 701 directly creating a conditioned air stream 105. Conversely, when the matrices (704 and 705) are rotated such that they are no longer touching at the common interface, then a gap exists as shown in the figure. In this instance, some air 105 will continue to pass through the membrane-contactor panels 701 and be conditioned; however, some air 252 will bypass the membrane-contactor panels 701 and exit the membrane-contactor-based air conditioner 700 unconditioned. The controller 254 may control the motor(s) 706 based on sensor feedback from the sensor 259 or an input entered to the controller 254 (e.g., via an operator).

Figure 24:
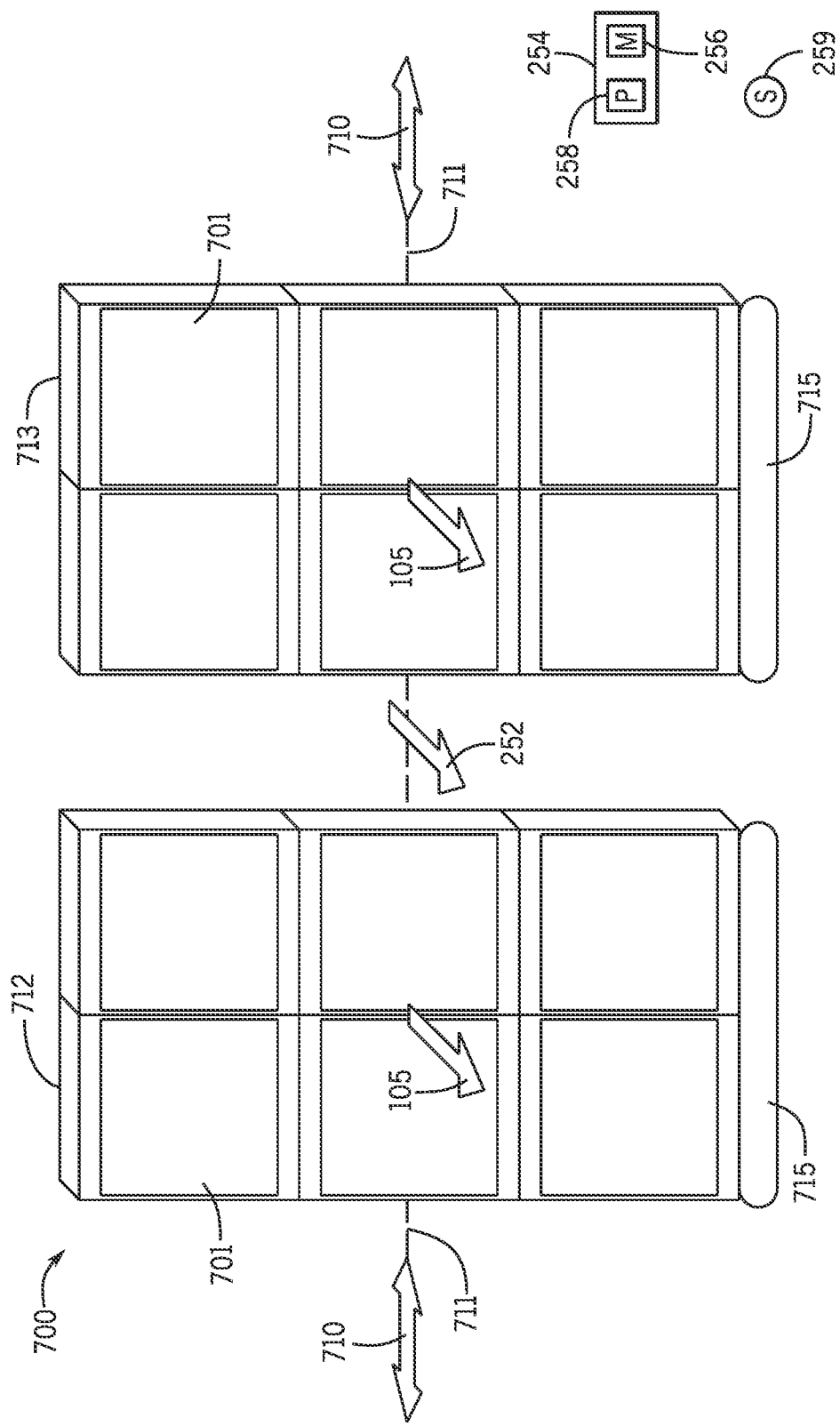
FIG. 24 is an illustration of a possible feature of a membrane-contactor-based air conditioner, wherein two or more physically distinct matrices of membrane-contactor panels meet at a common interface(s) and each of which are connected to an axis permitting translation along said axis through the use of an actuating device, in accordance with an aspect of the present disclosure.

A further potential feature of the membrane-contactor-based air conditioner 700 is shown in FIG. 24. In this figure, two physically distinct matrices (712 and 713) of membrane-contactor panels 701 are connected to an axis 711 that permits translation 710 perpendicular to the direction of air flow (105 and 252) using any potential actuating device. The translation 710 of the membrane-contactor panels 701 may be caused by actuation mechanisms, such as motors 715, controlled by the controller 254 (e.g., based on sensor data from the sensor 259 or an input received by the controller 254 from an operator). This feature enables different airpaths to form within the overall membrane-contactor-based air conditioner 700. In one instance, when the matrices (712 and 713) are touching at the common interface, the gap as shown in the figure does not exist. As such, all air 105 will pass through the membrane-contactor panels 701 and becomes conditioned as it exits the membrane-contactor-based air conditioner. Conversely, when the matrices (712 and 713) translate apart (in direction 710), a gap forms between the matrices (712 and 713). This allows some air 105 to be conditioned as it moves through the membrane-contactor panels, while some air 252 bypasses the membrane-contactor panels 701 altogether and exits the membrane-contactor-based air conditioner 700 unconditioned.

The present disclosure is not to be limited in scope by the specific embodiments described herein. Indeed, various modifications of the disclosure in addition to those described herein will become apparent to those skilled in the art from the foregoing description. Such modifications are intended to fall within the scope of the appended claims.

While only certain features and embodiments of the disclosure have been illustrated and described, many modifications and changes may occur to those skilled in the art, such as variations in sizes, dimensions, structures, shapes and proportions of the various elements, values of parameters including temperatures and pressures, mounting arrangements, use of materials, colors, orientations, etc., without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

All patents, applications, publications, test methods, literature, and other materials cited herein are hereby incorporated by reference.

The invention claimed is:

1. An air conditioner, comprising:
    an air flow path configured to direct an air flow in an average air flow direction;
    a plurality of evaporative cooling membrane panels extending across the air flow path transverse to the average air flow direction and forming a closed array configured to prevent a substantial portion of the air flow from bypassing the plurality of evaporative cooling membrane panels;
    a first evaporative cooling membrane panel of the plurality of evaporative cooling membrane panels;
    a second evaporative cooling membrane panel of the plurality of evaporative cooling membrane panels, wherein the first evaporative cooling membrane panel and the second evaporative cooling membrane panel are disposed in a V-banked array in the closed array such that the first evaporative cooling membrane panel and the second evaporative cooling membrane panel are obliquely angled relative to the average air flow direction;
    a third evaporative cooling membrane panel of the plurality of evaporative cooling membrane panels; and
    a fourth evaporative cooling membrane panel of the plurality of evaporative cooling membrane panels, wherein the third evaporative cooling membrane panel and the fourth evaporative cooling membrane panel are disposed in an additional V-banked array in the closed array such that the third evaporative cooling membrane panel and the fourth evaporative cooling membrane panel are obliquely angled relative to the average air flow direction, wherein the V-banked array and the additional V-banked array are disposed side-by-side in alignment across the air flow path, and wherein each evaporative cooling membrane panel of the plurality of evaporative cooling membrane panels comprises a face that is defined by a plurality of microporous fibers, each microporous fiber of the plurality of microporous fibers being configured to:
        receive liquid in a fluid flow path of the microporous fiber such that the air flow over the microporous fiber generates a vapor; and
        release the vapor into the air flow via pores of the microporous fiber.

2. The air conditioner of claim 1, wherein:
    the fluid flow path of each microporous fiber of the plurality of microporous fibers is configured to direct the liquid therethrough; and
    the pores of each microporous fiber of the plurality of microporous fibers are configured to block passage of the liquid therethrough but allow passage of the vapor therethrough.

3. The air conditioner of claim 1, wherein the air flow path comprises a rectangular shape in which the plurality of evaporative cooling membrane panels is disposed.

4. An air conditioner, comprising:
    a rectangular air flow path configured to direct an air flow in a direction corresponding to an axis of the rectangular air flow path;
    a plurality of evaporative cooling panels disposed in the rectangular air flow path and forming a closed array configured to prevent a substantial portion of the air flow from bypassing the plurality of evaporative cooling panels;
    a first evaporative cooling panel of the plurality of evaporative cooling panels and forming a first part of the closed array, wherein the first evaporative cooling panel comprises a first face;
    a second evaporative cooling panel of the plurality of evaporative cooling panels and forming a second part of the closed array, wherein the second evaporative cooling panel comprises a second face, and wherein the first evaporative cooling panel and the second evaporative cooling panel are disposed in a V-banked array in the closed array such that the first face of the first evaporative cooling panel and the second face of the second evaporative cooling panel are obliquely angled relative to the direction;
a third evaporative cooling panel of the plurality of evaporative cooling panels and forming a third part of the closed array, wherein the third evaporative cooling panel comprises a third face; and
a fourth evaporative cooling panel of the plurality of evaporative cooling panels and forming a fourth part of the closed array, wherein the third evaporative cooling panel and the fourth evaporative cooling panel are disposed in an additional V-banked array in the closed array such that the third face of the third evaporative cooling panel and the fourth face of the fourth evaporative cooling panel are obliquely angled relative to the direction, wherein the V-banked array and the additional V-banked array are disposed side-by-side in alignment across the rectangular air flow path, and wherein each of the first face, the second face, the third face, and the fourth face is defined at least in part by a membrane or portion thereof, the membrane being defined by a plurality of microporous fibers, each microporous fiber of the plurality of microporous fibers comprising a fluid flow path configured to direct a fluid therethrough and pores configured to block passage of the fluid in a liquid form through the pores but allow passage of the fluid in a vapor form through the pores.

5. The air conditioner of claim 4, wherein the first evaporative cooling panel and the second evaporative cooling panel are disposed in series relative to a flow of the fluid such that the second evaporative cooling panel is configured to receive the fluid from the first evaporative cooling panel.

6. The air conditioner of claim 4, wherein the first evaporative cooling panel and the second evaporative cooling panel are disposed in parallel relative to a flow of the fluid such that the first evaporative cooling panel is configured to receive a first portion of the fluid and the second evaporative cooling panel is configured to receive a second portion of the fluid different than the first portion.

7. The air conditioner of claim 4, comprising a controller configured to control rotational or translational movement of at least one of the first evaporative cooling panel, the second evaporative cooling panel, the third evaporative cooling panel, or the fourth evaporative cooling panel to cause a transition of the plurality of evaporative cooling panels from the closed array to an open configuration in which a gap is formed between adjacent evaporative cooling panels of the plurality of evaporative cooling panels, the gap being configured to receive a portion of the air flow such that the portion of the air flow bypasses the plurality of evaporative cooling panels in the open configuration.

8. The air conditioner of claim 4, wherein the rectangular air flow path is defined by a rectangular duct.

9. The air conditioner of claim 4, wherein the rectangular air flow path is defined by a rectangular air handling unit (AHU).

10. An air conditioner, comprising:
an air flow path configured to direct an air flow in an average air flow direction;
a first evaporative cooling membrane panel disposed in the air flow path and comprising a first face;
a second evaporative cooling membrane panel disposed in the air flow path and comprising a second face;
a V-banked array comprising the first evaporative cooling membrane panel and the second evaporative cooling membrane panel such that the first face of the first evaporative cooling membrane panel and the second face of the second evaporative cooling membrane panel are obliquely angled relative to the average air flow direction;
a third evaporative cooling membrane panel disposed in the air flow path and comprising a third face;
a fourth evaporative cooling membrane panel disposed in the air flow path and comprising a fourth face; and
an additional V-banked array comprising the third evaporative cooling membrane panel and the fourth evaporative cooling membrane panel such that the third face of the third evaporative cooling membrane panel and the fourth face of the fourth evaporative cooling membrane panel are obliquely angled relative to the average air flow direction, wherein the V-banked array and the additional V-banked array are disposed side-by-side in alignment across the air flow path in a closed configuration.

11. The air conditioner of claim 10, wherein each of the first face, the second face, the third face, and the fourth face is defined by a plurality of microporous fibers, each microporous fiber of the plurality of microporous fibers being configured to:
receive liquid in a fluid flow path of the microporous fiber such that the air flow over the microporous fiber generates a vapor; and
release the vapor into the air flow via pores of the microporous fiber.

12. The air conditioner of claim 10, wherein the air flow path comprises a rectangular cross-section, and the V-banked array and the additional V-banked array are disposed side-by-side in alignment across a width of the rectangular cross-section of the air flow path.

13. The air conditioner of claim 10, comprising a controller configured to control a rotational or translational movement of at least one of the first evaporative cooling membrane panel, the second evaporative cooling membrane panel, the third evaporative cooling membrane panel, or the fourth evaporative cooling membrane panel to transition the air conditioner from:
the closed configuration to an open configuration in which an air flow bypass gap is formed; and
the open configuration to the closed configuration in which the air flow bypass gap is blocked.

14. The air conditioner of claim 10, wherein the first evaporative cooling membrane panel and the second evaporative cooling membrane panel are disposed in series relative to a flow of a liquid through the air conditioner such that the second evaporative cooling membrane panel is configured to receive the liquid from the first evaporative cooling membrane panel.

15. The air conditioner of claim 10, wherein the first evaporative cooling membrane panel and the second evaporative cooling membrane panel are disposed in parallel relative to a flow of a liquid through the air conditioner such that the first evaporative cooling membrane panel is configured to receive a first portion of the liquid and the second evaporative cooling membrane panel is configured to receive a second portion of the liquid different than the first portion of the liquid.

16. The air conditioner of claim 10, comprising a fan or blower configured to bias the air flow through the air flow path.

17. The air conditioner of claim 1, wherein the first evaporative cooling membrane panel and the second evaporative cooling membrane panel are disposed in series relative to a flow of the liquid such that the second evaporative cooling membrane panel is configured to receive the liquid from the first evaporative cooling membrane panel.

18. The air conditioner of claim 1, wherein the first evaporative cooling membrane panel and the second evaporative cooling membrane panel are disposed in parallel relative to a flow of the liquid such that the first evaporative cooling membrane panel is configured to receive a first portion of the liquid and the second evaporative cooling membrane panel is configured to receive a second portion of the liquid different than the first portion of the liquid.

19. The air conditioner of claim 1, wherein the air flow path comprises a rectangular cross-section, and the V-banked array and the additional V-banked array are disposed side-by-side in alignment across a width of the rectangular cross-section of the air flow path.

20. The air conditioner of claim 1, comprising a controller configured to control a rotational or translational movement of at least one of the first evaporative cooling membrane panel, the second evaporative cooling membrane panel, the third evaporative cooling membrane panel, or the fourth evaporative cooling membrane panel to transition the plurality of evaporative cooling membrane panels from:

the closed array to an open configuration in which an air flow bypass gap is formed; and the open configuration to the closed array in which the air flow bypass gap is blocked.

* * * * *